US 11,447,934 B2

(12) United States Patent
Kurokami et al.

(10) Patent No.: US 11,447,934 B2
(45) Date of Patent: Sep. 20, 2022

(54) WORK MACHINE

(71) Applicant: HITACHI CONSTRUCTION MACHINERY CO., LTD., Tokyo (JP)

(72) Inventors: Kazushige Kurokami, Tsukuba (JP); Shigeki Tokita, Tsuchiura (JP); Hiroshi Sakamoto, Hitachi (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 17/275,223

(22) PCT Filed: Feb. 4, 2020

(86) PCT No.: PCT/JP2020/004168
§ 371 (c)(1),
(2) Date: Mar. 11, 2021

(87) PCT Pub. No.: WO2020/183987
PCT Pub. Date: Sep. 17, 2020

(65) Prior Publication Data
US 2022/0049476 A1 Feb. 17, 2022

(30) Foreign Application Priority Data
Mar. 13, 2019 (JP) .............................. JP2019-046516

(51) Int. Cl.
E02F 9/26 (2006.01)
B60K 35/00 (2006.01)
(Continued)

(52) U.S. Cl.
CPC .............. E02F 9/264 (2013.01); B60K 35/00 (2013.01); G06F 3/14 (2013.01); G06T 19/006 (2013.01);
(Continued)

(58) Field of Classification Search
None
See application file for complete search history.

(56) References Cited

U.S. PATENT DOCUMENTS 5,887,365 A * 3/1999 Fujishima .............. E02F 9/226
700/59
2013/0050258 A1 * 2/2013 Liu ......................... G06F 3/013
345/633
(Continued)

FOREIGN PATENT DOCUMENTS

JP 3923747 B2 6/2007
JP 2017-115492 A 6/2017
(Continued)

OTHER PUBLICATIONS

International Preliminary Report on Patentability received in corresponding International Application No. PCT/JP2020/004168 dated Sep. 23, 2021.
(Continued)

Primary Examiner — Jason A Pringle-Parker
(74) Attorney, Agent, or Firm — Mattingly & Malur, PC

(57) ABSTRACT

The line-of-sight direction of an operator is estimated on the basis of the posture of a front work device detected by a posture sensor, and plural display regions are set on a screen of a transparent display on the basis of the estimated line-of-sight direction of the operator. Then, the display position of a display image is calculated in such a manner that the display position is located in the display region corresponding to the kind of the display image in the set plural display regions. When the positions of the display regions on the display device change due to change of the line-of-sight direction of the operator, the display position of the display image is held if the display image is located in the display region corresponding to the kind of the display image also after the change, and a new display position of
(Continued)

the display image is calculated in such a manner that the new display position falls within the display region corresponding to the kind of the display image again if the display image gets out of the corresponding display region after the change.

5 Claims, 16 Drawing Sheets

(51) Int. Cl.
*G06F 3/14* (2006.01)
*G09G 3/00* (2006.01)
*G06T 19/00* (2011.01)

(52) U.S. Cl.
CPC ........ *G09G 3/002* (2013.01); *B60K 2370/152* (2019.05); *B60K 2370/171* (2019.05); *G09G 2340/0464* (2013.01); *G09G 2354/00* (2013.01); *G09G 2380/10* (2013.01)

(56) References Cited

U.S. PATENT DOCUMENTS

| | | | | |
|---|---|---|---|---|
| 2014/0035959 A1* | 2/2014 | Lapstun | ............ | G02B 27/0075 359/200.7 |
| 2015/0317835 A1* | 11/2015 | Byers | .................. | G06V 40/103 345/633 |
| 2016/0004305 A1* | 1/2016 | Pagliani | ................... | H04N 9/31 345/633 |
| 2018/0239136 A1* | 8/2018 | Ishikawa | ................. | G06F 3/013 |
| 2018/0251961 A1* | 9/2018 | France | .................... | E02F 3/435 |
| 2018/0373032 A1 | 12/2018 | Ohiwa et al. | | |
| 2019/0018498 A1* | 1/2019 | West | ....................... | G06F 3/012 |
| 2019/0161942 A1* | 5/2019 | Hokkanen | ............. | E02F 9/2004 |
| 2019/0194913 A1* | 6/2019 | Petrany | .................... | E02F 9/265 |
| 2019/0250408 A1* | 8/2019 | Lafon | .................... | A61B 3/113 |
| 2019/0291579 A1 | 9/2019 | Fujita | | |
| 2019/0352885 A1 | 11/2019 | Kurokami et al. | | |
| 2020/0048052 A1* | 2/2020 | Lyngbäck | ............... | B66C 15/06 |

FOREIGN PATENT DOCUMENTS

| | | |
|---|---|---|
| JP | 6253417 B2 | 12/2017 |
| JP | 2018-150017 A | 9/2018 |
| JP | 2018-172857 A | 11/2018 |
| WO | 2018/110045 A1 | 6/2018 |

OTHER PUBLICATIONS

International Search Report of PCT/JP2020/004168 dated Apr. 28, 2020.

Korean Office Action received in corresponding Korean Application No. 10-2021-7005190 dated Jul. 20, 2022.

* cited by examiner

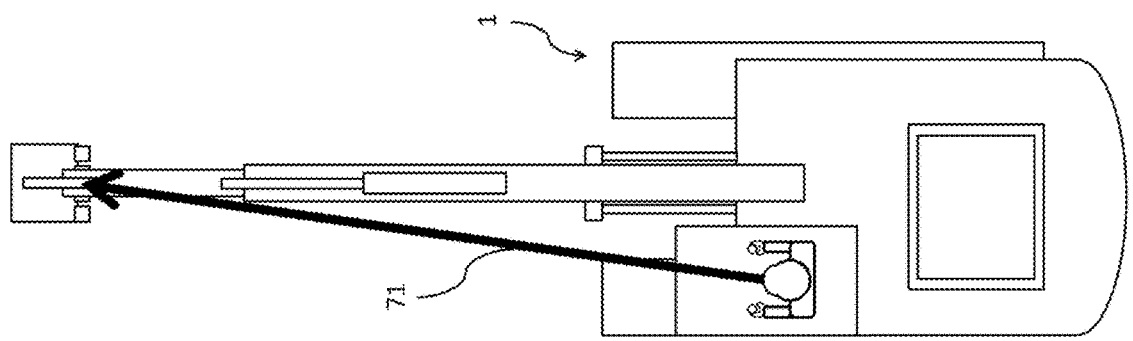
Fig. 7
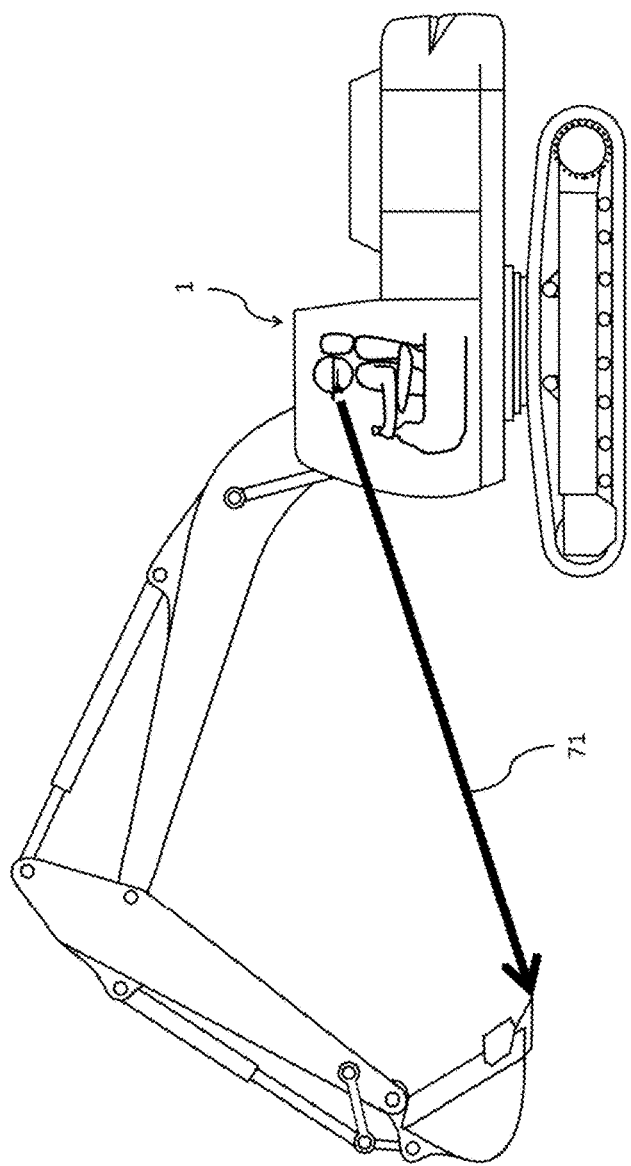

Fig. 8

| DISPLAY REGION | DISPLAY IMAGE NAME | VISUAL FIELD RANGE | HORIZONTAL ANGLE [deg] | VERTICAL ANGLE [deg] |
|---|---|---|---|---|
| FIRST DISPLAY REGION | DISTANCE BETWEEN TARGET TERRAIN SURFACE AND TIP PART OF BUCKET 1c<br>ANGLE BETWEEN TARGET TERRAIN SURFACE AND TIP PART OF BUCKET 1c<br>: | FIRST VISUAL FIELD RANGE (EFFECTIVE VISUAL FIELD) | −10〜10 | −5〜5 |
| SECOND DISPLAY REGION | ICON OF WARNING OF MACHINE BODY ABNORMALITY<br>WARNING OF APPROACH OF SURROUNDING WORK MACHINE<br>: | SECOND VISUAL FIELD RANGE (INDUCED VISUAL FIELD) | −40〜40 | −30〜30 |
| OUTSIDE-OF-VISUAL-FIELD-RANGE DISPLAY REGION | ICON OF MACHINE BODY STATE<br>CLOCK TIME<br>HOUR METER<br>FUEL LEVEL<br>WATER TEMPERATURE METER<br>OIL TEMPERATURE METER<br>: | OUTSIDE OF VISUAL FIELD RANGE | — | — |

81

WORK MACHINE

TECHNICAL FIELD

The present invention relates to a work machine including a display device.

BACKGROUND ART

In recent years, in work machines such as hydraulic excavators, functions regarding which it is envisaged that work support information is output from a display device such as a monitor and an operator executes operation on the basis of the work support information have been increasing. As one example of such functions, there is a machine guidance function to present target terrain profile information of a working subject to the operator. It is envisaged that the line of sight of the operator in work who uses the machine guidance function repeatedly moves back and forth between the tip of the work device at which actual work is being executed and the surroundings thereof (specifically, bucket, terrain, and so forth) and the target terrain profile information displayed on a screen of a display device in a cab. At this time, it is considered that, as the distance across the line of sight is moved becomes longer, the time necessary to visually recognize the target terrain profile information increases, and this leads to the lowering of the work efficiency.

As a technique relating to displaying of the work support information, the following technique is disclosed in Patent Document 1. The work support information is displayed on a transparent display installed on the front surface of a cab and the display position of the work support information on the display device is made to follow movement of a bucket. In addition, when the bucket moves in the forward-rearward direction relative to the cab, the display mode of the work support information on the display device is changed on the basis of the position of the bucket. As the bucket comes closer to the cab, the work support information is more likely to overlap with the bucket from the viewpoint of the operator. This technique is intended to prevent the lowering of operability of a work vehicle due to the overlap between the work support information and the bucket.

PRIOR ART DOCUMENT

Patent Document

Patent Document 1: JP-2017-115492-A

SUMMARY OF THE INVENTION

Problem to be Solved by the Invention

However, in the method of Patent Document 1, the display position of the work support information also moves in such a manner as to follow the position of the bucket. That is, the display position of the work support information also moves constantly through the movement of the bucket, and the movement of the work support information is therefore likely to cause the operator in work to feel troublesomeness. Further, in the method of Patent Document 1, when the display area of the work support information increases through increase in the amount of work support information displayed on the transparent display, or the like, there is a possibility that the visibility of the vicinity of the bucket is impaired due to the work support information and displaying the work support information lowers the work efficiency conversely.

The present invention is made with attention paid to the above-described problem, and an object thereof is to provide a work machine that can prevent an operator from feeling troublesomeness in displaying of work support information on a display device and prevent the lowering of the work efficiency when the amount of the information increases.

Means for Solving the Problem

The present application includes plural means for solving the above-described problem. To cite one example thereof, there is provided a work machine including a work device attached to a work machine main body, a posture sensor that detects posture of the work device, a display device capable of displaying work support information provided to an operator in such a manner as to overlap the work support information with an actual image of the work device, and a display controller that decides a display position on the display device regarding a display image that shows the work support information and displays the display image at the display position. The display controller is configured to estimate a line-of-sight direction of the operator on the basis of the posture of the work device detected by the posture sensor, set a plurality of display regions on a screen of the display device with use of the estimated line-of-sight direction of the operator as a basis, and calculate the display position of the display image in such a manner that the display position is located in a display region corresponding to the kind of the display image in the plurality of display regions. The display controller is configured to, when positions of the plurality of display regions on the screen of the display device change due to change of the line-of-sight direction of the operator, hold the display position of the display image if the display image is located in the display region corresponding to the kind of the display image also after the change and calculate a new display position of the display image in such a manner that the new display position falls within the display region corresponding to the kind of the display image if the display image gets out of the display region corresponding to the kind of the display image after the change.

Advantages of the Invention

According to the present invention, in displaying of the work support information on the display device, it is possible to prevent an operator from feeling troublesomeness and prevent the lowering of the work efficiency when the amount of the information increases.

BRIEF DESCRIPTION OF THE DRAWINGS

FIG. 7 is a diagram illustrating an example of a line-of-sight vector.

FIG. 8 is a diagram illustrating an example of a visual field range list (display range list).

MODES FOR CARRYING OUT THE INVENTION

An embodiment of the present invention will be described below by using the drawings.

In the following, as a work machine, a hydraulic excavator including a bucket as a work tool (attachment) at the tip of a work device will be exemplified. However, the present invention may be applied to a work machine including an attachment other than the bucket. Further, application to a work machine other than the hydraulic excavator is also possible as long as the work machine is what has an articulated work device configured by joining plural link members (attachment, boom, arm, and so forth).

Figure 1:
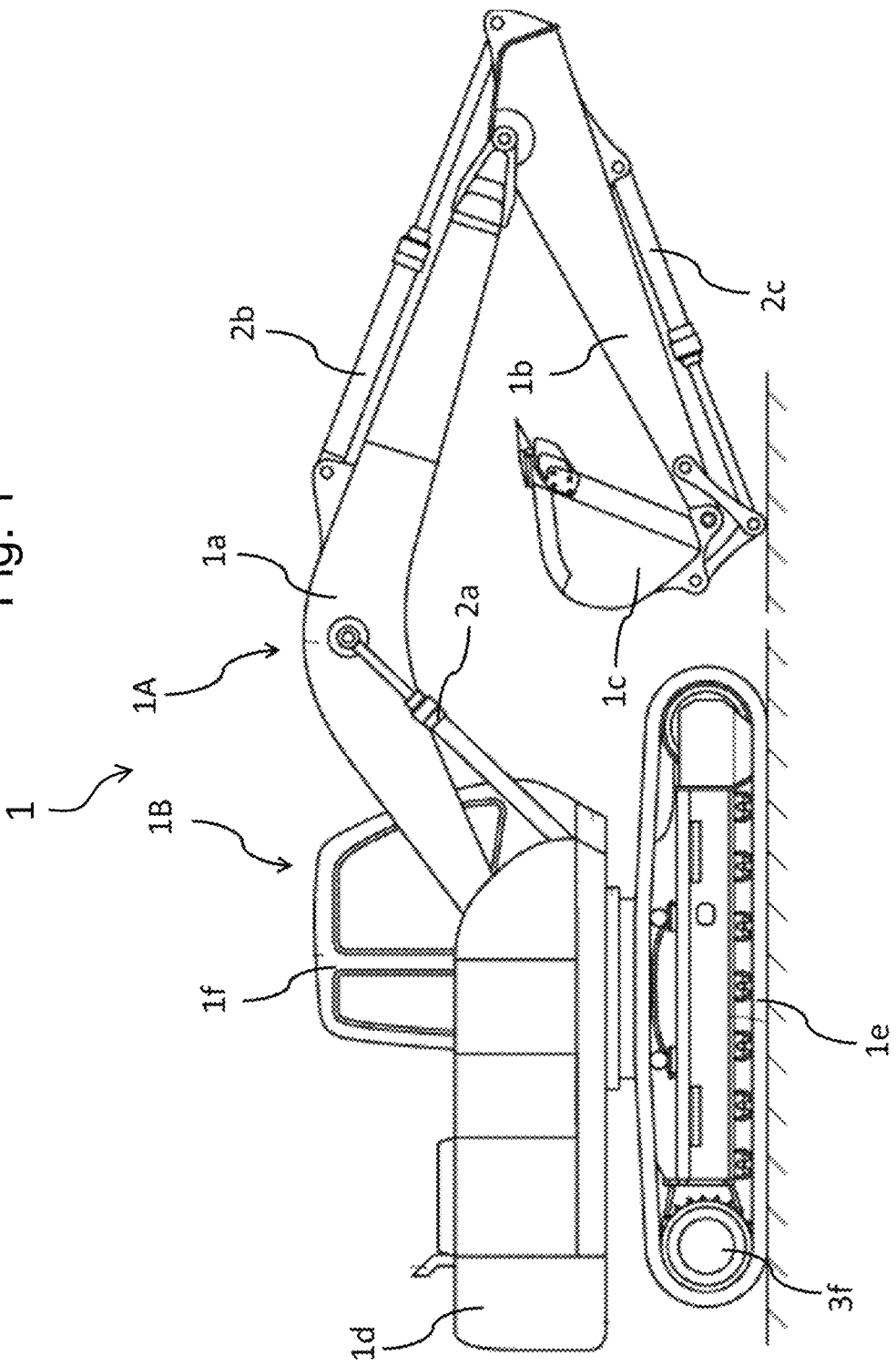
FIG. 1 is a diagram illustrating the exterior appearance of a hydraulic excavator that is one example of a work machine.

A side view of a hydraulic excavator that is one example of a work machine according to the embodiment of the present invention is illustrated in FIG. 1. A hydraulic excavator 1 illustrated in this diagram includes an articulated front work device 1A configured by linking plural front members (boom 1a, arm 1b, and bucket 1c) that each pivot in the perpendicular direction and a machine body 1B including an upper swing structure 1d and a lower track structure 1e. The front work device 1A is attached to the machine body 1B (work machine main body) and the upper swing structure 1d is equipped with a cab 1f.

The base end of the boom 1a of the front work device 1A is pivotally supported at the front part of the upper swing structure 1d with the intermediary of a boom pin. The base end of the arm 1b is pivotally joined to the tip of the boom 1a with the intermediary of an arm pin. The base end of the bucket 1c is pivotally joined to the tip of the arm 1b with the intermediary of a bucket pin. The boom 1a is driven by a boom cylinder 2a. The arm 1b is driven by an arm cylinder 2b. The bucket 1c is driven by a bucket cylinder 2c.

Figure 2:
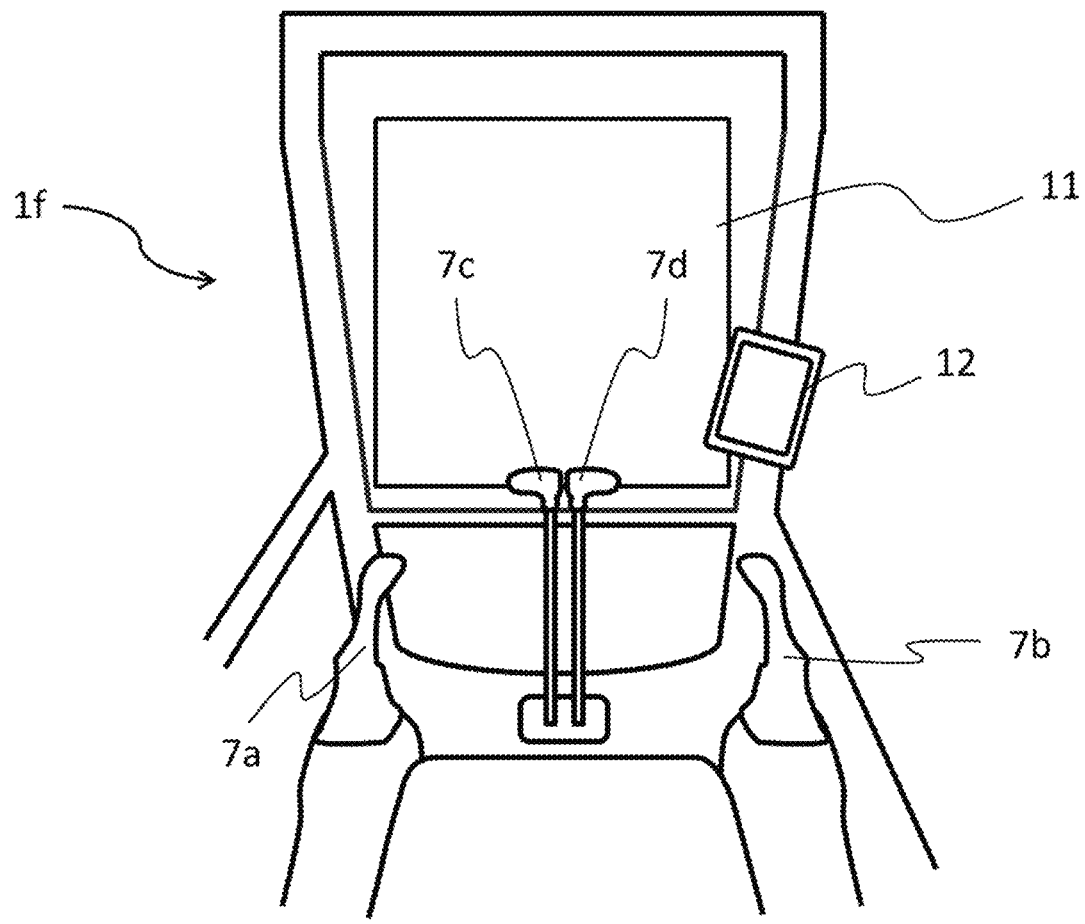
FIG. 2 is a diagram illustrating the interior appearance of a cab according to the present embodiment.
Figure 3:
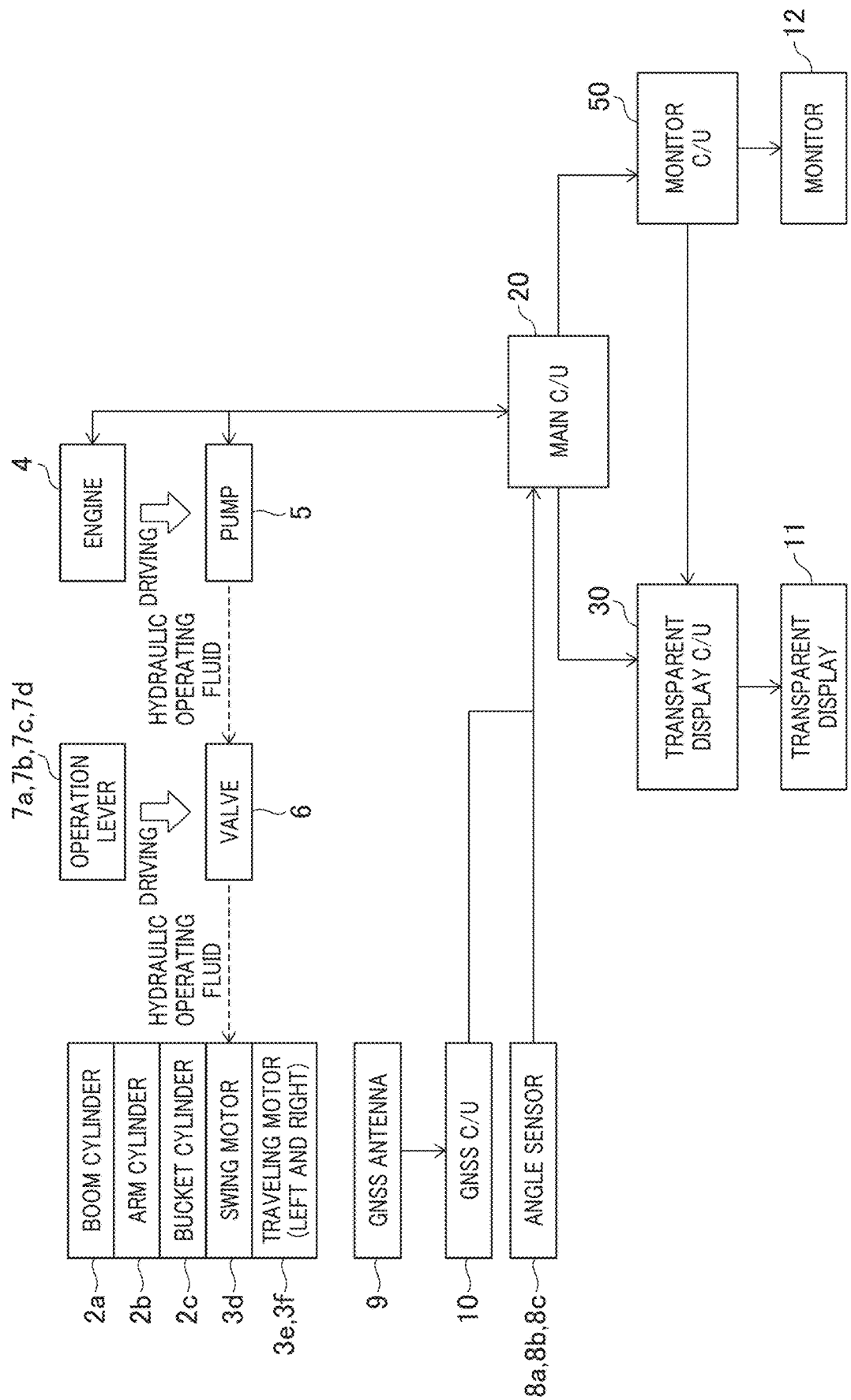
FIG. 3 is a diagram illustrating the overall configuration of the hydraulic excavator according to the present embodiment.

The upper swing structure 1d is driven by a swing motor 3d (see FIG. 3) and the lower track structure 1e is driven by left and right traveling motors 3e and 3f (see FIG. 3). The upper swing structure 1d is equipped with an engine 4, a pump 5, and a valve (control valve) 6 (see FIG. 3) for operating the hydraulic excavator 1 and the pump 5 is rotationally driven by the engine 4 to deliver hydraulic operating fluid to the respective actuators 2a, 2b, 2c, 3d, 3e, and 3f (see FIG. 3). Further, the valve 6 changes the flow rate and the circulation direction of the hydraulic operating fluid according to operation input from operation levers 7a, 7b, 7c, and 7d (see FIG. 2) disposed in the cab 1f to thereby control operation of the respective actuators 2a, 2b, 2c, 3d, 3e, and 3f.

FIG. 2 illustrates the interior appearance of the cab 1f. In the cab 1f, the four operation levers 7a, 7b, 7c, and 7d as operation devices to make instructions of operation of the machine body including operation of the respective hydraulic actuators 2a, 2b, 2c, 3d, 3e, and 3f, a transparent display 11 that is a display device for displaying work support information provided to the operator, and a monitor 12 are installed. The transparent display 11 is installed on the cab front surface. A liquid crystal screen of the transparent display 11 is transmissive and the work support information on the liquid crystal screen can be displayed while being overlapped with an actual image of the front work device 1A.

The operation lever 7a (operation left lever) is a lever for operating the arm cylinder 2b (arm 1b) and the upper swing structure 1d (swing hydraulic motor 3d), and the operation lever 7b (operation right lever) is a lever for operating the boom cylinder 2a (boom 1a) and the bucket cylinder 2c (bucket 1c). Further, the operation lever 7c (traveling left lever) is a lever for operating the lower track structure 1e (left traveling hydraulic motor 3e (see FIG. 3)), and the operation lever 7d (traveling right lever) is a lever for operating the lower track structure 1e (right traveling hydraulic motor 3f).

FIG. 3 is a system configuration diagram of the hydraulic excavator according to the embodiment of the present invention. The hydraulic excavator according to the present embodiment is equipped with, as controllers, a main control unit (hereinafter, control unit is often abbreviated as "C/U") 20, a GNSS C/U 10 for processing a GNSS signal, and a transparent display C/U 30 and a monitor C/U 50 that are used as display controllers. These C/Us 10, 20, 30, and 50 are each a controller including a processing device (for example CPU or the like) and a storing device (for example semiconductor memory such as ROM and RAM) and are configured to execute various kinds of processing prescribed by a program stored in the storing device through execution of the program by the processing device.

For the boom pin, the arm pin, and the bucket pin included in the front work device 1A, angle sensors 8a, 8b, and 8c that detect the pivot angle of the boom 1a, the arm 1b, and the bucket 1c are set. The posture of the front work device 1A can be detected on the basis of the detected angles of the angle sensors 8a, 8b, and 8c, and the angle sensors 8a, 8b, and 8c function as a posture sensor of the front work device 1A. There are attached to the upper swing structure 1d two GNSS (Global Navigation Satellite System) antennas 9 that receive a navigation signal (satellite signal) for calculating the location of the hydraulic excavator 1.

The main C/U 20 carries out control of the system serving as the basis of the hydraulic excavator, such as engine control and pump control. In addition, the main C/U 20 generates work support information on the basis of input from various sensors (for example angle sensors 8a, 8b, and 8c) and outputs it to the transparent display C/U 30 and the monitor C/U 50.

The GNSS C/U 20 calculates the location (coordinate value) of the upper swing structure 1d in the world coordinate system on the basis of the navigation signal received by the GNSS antennas 9 and outputs the calculation result thereof to the main C/U 20.

The respective display controllers (transparent display C/U and monitor C/U) 30 and 50 execute creation of a display image in which work support information is included and related information thereof on the basis of information input from the main C/U 20 and make decision of the display positions of this display image and this related information on screens of the transparent display 11 and the monitor 12, and output a signal (display control signal) to the respective display devices 11 and 12. Then, the respective display devices 11 and 12 execute displaying of the work support information (display image and related information thereof) to the operator on the basis of the signal from the respective display controllers 30 and 50. The hydraulic excavator 1 of the present embodiment is equipped with a machine guidance function and, for example, can display, on the display devices 11 and 12, information regarding the distance between a target terrain surface and the tip part (for example, claw tip) of the bucket 1c and the angle between the bottom surface of the bucket 1c and the target terrain surface (angle information) as the work support information (display image).

(Transparent Display C/U 30)

Figure 4:
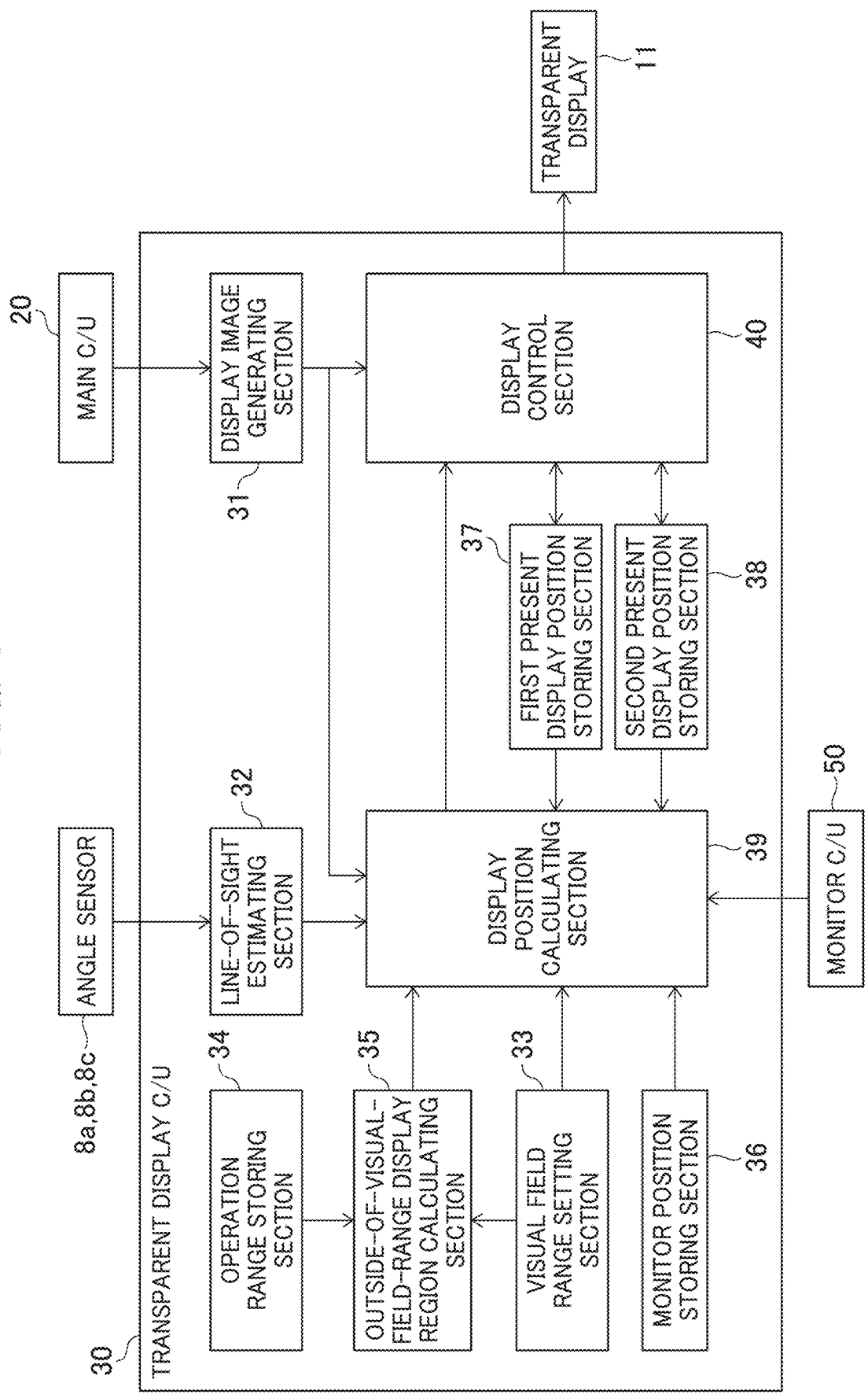
FIG. 4 is a diagram illustrating functional blocks of a transparent display C/U.

FIG. 4 is a functional block diagram of the transparent display C/U 30 and illustrates the flow of processing in the transparent display C/U 30. Pieces of information from the angle sensors 8a, 8b, and 8c, the main C/U 20, and the monitor C/U 50 are input to the transparent display C/U 30, and the transparent display C/U 30 outputs a display control signal generated based on these pieces of information to the transparent display 10.

The transparent display C/U 30 includes a display image generating section 31 that generates a display image to be displayed on the transparent display (display device) 11 as work support information, and a line-of-sight estimating section 32 that estimates the line-of-sight direction of the operator on the basis of the posture of the front work device 1A detected by the angle sensors 8a, 8b, and 8c. The transparent display C/U 30 also includes a visual field range setting section 33 that sets plural visual field ranges with a nested structure defined around the line-of-sight direction of the operator and the kinds of display images to be displayed in each of plural display regions corresponding to these plural visual field ranges, and an operation range storing section 34 that stores the range in which the front work device 1A can operate. The transparent display C/U 30 also includes an outside-of-visual-field-range display region calculating section 35 that calculates, as an outside-of-visual-field-range display region, the region obtained by excluding the range in which the plural display regions (visual field ranges) can move on the screen of the transparent display 11 from on the screen of the transparent display 11, and a monitor position storing section 36 that stores a position (representative point position) at which related information of the display image on the transparent display 11 is displayed on the monitor 12. The transparent display C/U 30 also includes a first present display position storing section 37 in which the display position of a display image (first display image) displayed in a first display region that is one of the plural display regions is stored, and a second present display position storing section 38 in which the display position of a display image (second display image) displayed in a second display region that is one of the plural display regions is stored. The transparent display C/U 30 also includes a display position calculating section 39 that calculates the display position of a display image in the display region in which this display image is displayed on the basis of the line-of-sight direction of the operator and the kind of display image, and a display control section 40 that displays this display image at the display position calculated by the display position calculating section 39. Functions (processing) of the respective sections in the transparent display C/U 30 will be described below.

(Display Image Generating Section 31)

The display image generating section 31 generates an image (display image) to be displayed on the transparent display 11 as work support information on the basis of information input from the main C/U 20 and outputs the generated image to the display position calculating section 39 and the display control section 40.

Figure 5:
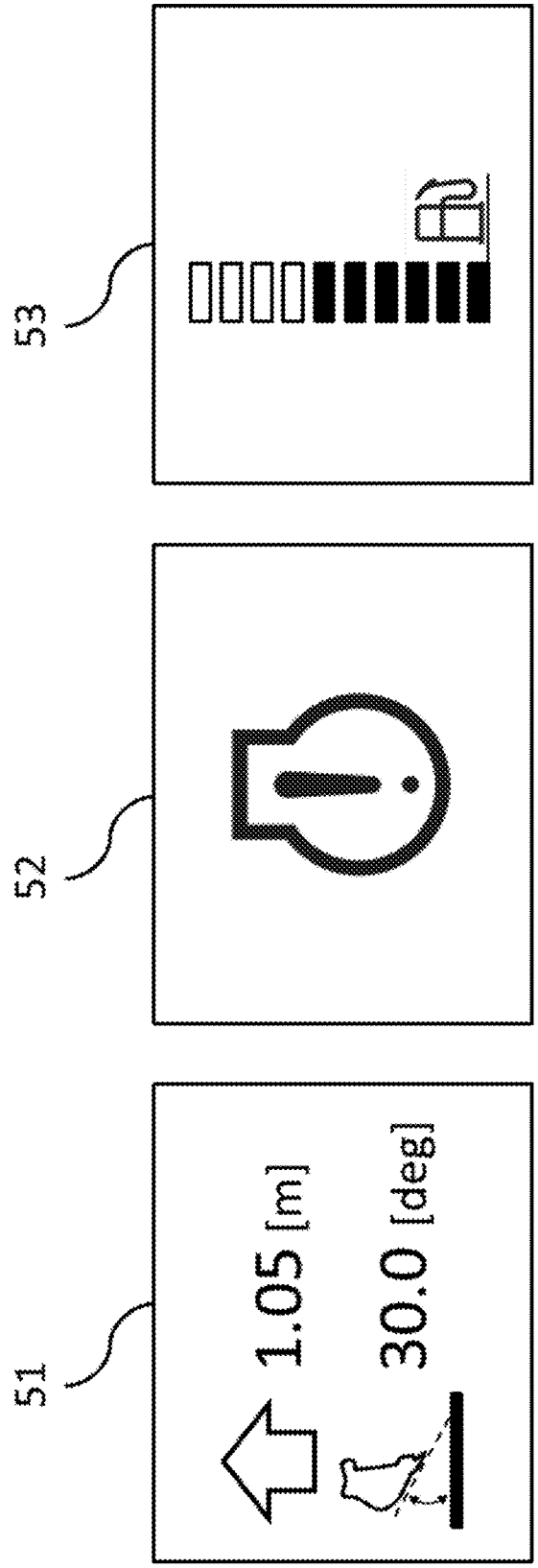
FIG. 5 is a diagram illustrating examples of a display image.

FIG. 5 is a diagram illustrating examples of the display image (work support information) generated by the display image generating section 31. FIG. 5 illustrates, as the examples of the display image, a distance-angle image 51 that shows the distance and the angle between a target terrain surface and the tip part of the bucket 1c, an engine abnormality warning image 52 displayed when the main C/U 20 has detected an abnormality of the engine 4, and a fuel level image 53 that shows the fuel level of the hydraulic excavator.

For example, regarding generation of the distance-angle image 51, the main C/U 20 can calculate the coordinates of the tip part of the bucket 1c in the machine body coordinate system on the basis of the detection values of the angle sensors 8a, 8b, and 8c, a dimension Lbm from the pivot shaft on the base end side of the boom 1a (boom pin) to the pivot shaft on the tip side (arm pin), a dimension Lam from the pivot shaft on the base end side of the arm 1b (arm pin) to the pivot shaft on the tip side (bucket pin), and a dimension Lbk from the pivot shaft on the base end side of the bucket 1c (bucket pin) to the tip part (bucket claw tip). Further, three-dimensional data of a target terrain surface around the hydraulic excavator is stored in the storing device of the main C/U 20, and the main C/U 20 calculates distance-angle information between the target terrain surface and the tip part of the bucket 1c on the basis of this three-dimensional data and the coordinates of the tip part of the bucket 1c and outputs the distance-angle information to the transparent display C/U 30. The display image generating section 31 of the transparent display C/U 30 generates the distance-angle image 51 on the basis of the distance-angle information calculated in the main C/U 20.

(Line-of-Sight Estimating Section 32)

Figure 6:
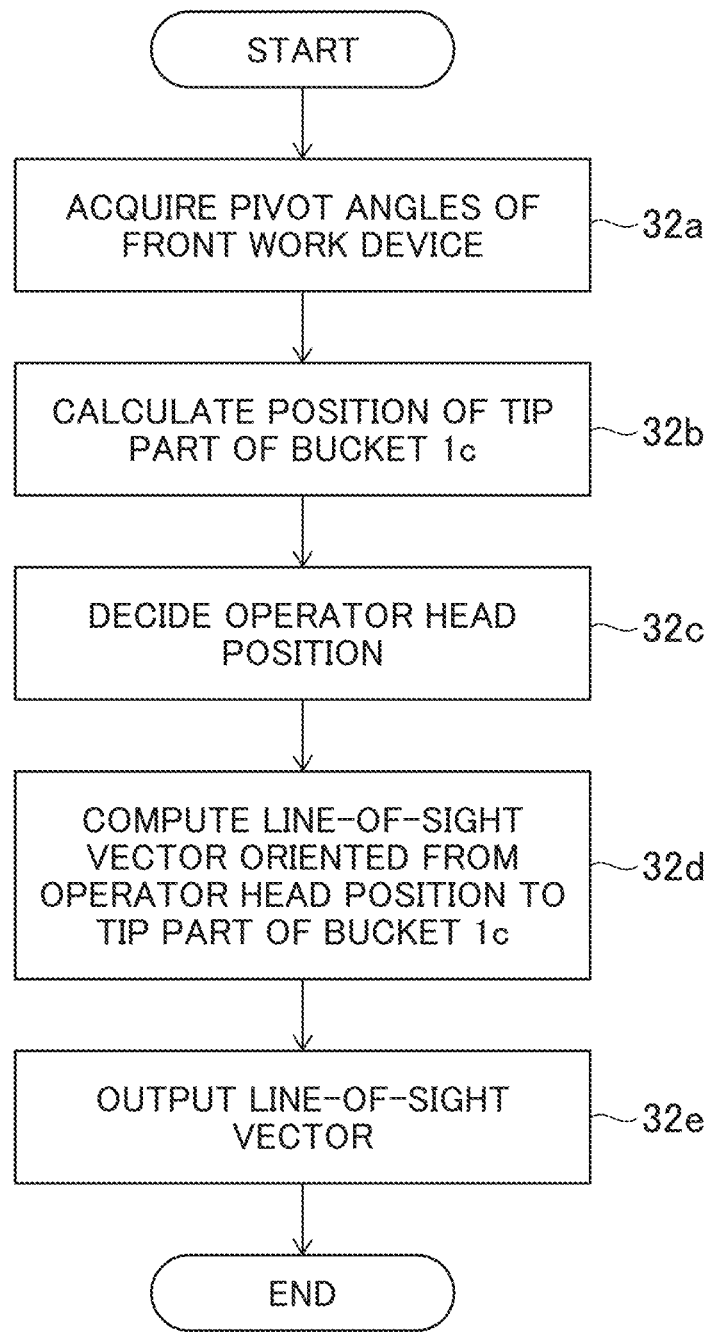
FIG. 6 is a diagram illustrating processing of a line-of-sight estimating section.

FIG. 6 illustrates the flow of processing of the line-of-sight estimating section 32. First, the line-of-sight estimating section 32 acquires the angles of the respective front members 1a, 1b, and 1c of the front work device 1A on the basis of output from the angle sensors 8a, 8b, and 8c (step 32a), and calculates the position coordinates of the center point of the tip part of the bucket 1c in the machine width direction on the basis of the angles and the dimensions of the respective front members 1a, 1b, and 1c (specifically, the above-described dimensions Lbm, Lam, and Lbk) (step 32b). The position coordinates at this time are represented by a machine body coordinate system based on a specific point in the upper swing structure 1d (for example, the midpoint of the center axis of the boom pin).

Next, in a step 32c, the line-of-sight estimating section 32 calculates the position coordinates of the head (head position) when the operator sits on an operation seat (seat) in the cab 1f. A publicly-known method can be used as the calculation method of the head position. For example, for the head position, coordinates at which the head of an operator with a standard body type is located when specific seat position and specific work posture are assumed are calculated and the values thereof can be set as the initial values of the head position. At this time, estimation of the head position may be executed more accurately by correcting these initial values by using a detection value of a sensor (for example, stroke sensor) that measures displacement of the seat position from a reference position. Further, it is also possible to execute detection of the head position with higher precision by attaching plural characteristic marks such as markers to a helmet of the operator and acquiring the position coordinates of each marker by a motion capture system or the like.

In a step 32d, the line-of-sight estimating section 32 computes a line-of-sight vector 71 of the operator illustrated in FIG. 7 from the position coordinates of the tip part of the bucket 1c in the machine body coordinate system calculated in the step S32b and the coordinates of the head position of the operator in the machine body coordinate system calculated in the step S32c, and outputs the line-of-sight vector 71 to the display position calculating section 39 (step 32e). FIG. 7 illustrates one example of the line-of-sight vector 71 calculated in the step 32d. In a work machine including the front work device 1A, such as the hydraulic excavator 1, it is envisaged that the operator executes operation while gazing at the tip of the front work device 1A, i.e., the tip part of the bucket 1c. Therefore, it is possible to estimate the line-of-sight vector 71 of the operator at the time of work by calculating the vector oriented from the head position calculated in the step S32c to the tip part of the bucket 1c calculated in the step S32b.

(Visual Field Range Setting Section 33)

The visual field range setting section 33 sets plural visual field ranges (for example, effective visual field (first visual field range), induced visual field (second visual field range), and outside of the visual field range) with a nested structure defined around the line-of-sight direction of the operator and the kinds of display images displayed in each of plural display regions (image display regions) set on the display screen of the transparent display (display device) 11 corresponding to each of the plural visual field ranges. The setting of the plural visual field ranges and the setting of the kinds of display images displayed in each of the plural display regions may be executed in advance separately from calculation processing of the display position of the display image and be stored in the storing device of the transparent display C/U 30.

The display image (work support information) is different in the number of times of reference thereto made by the operator according to the kind thereof. For example, it is preferable to classify display images which the operator frequently visually recognizes like a display image relating to the machine guidance function (for example, distance-angle image 51) as images displayed in the effective visual field, which is the visual field range in which an object can be visually recognized through only movement of the light of sight without action of the head. On the other hand, display images relating to warning indication (for example, engine abnormality warning image 52) are frequently visually recognized by the operator compared with the display images relating to the machine guidance function. However, when the display image is displayed, the operator needs to immediately perceive the existence thereof and make a proper response according to the state. For this reason, these display images have low necessity of being displayed in the effective visual field located near the point of gaze of the operator and it is preferable to classify these display images as images displayed in the induced visual field in which the existence thereof can be perceived even during work. Further, display images relating to the machine body state and the clock time (for example, fuel level image 53) have a low frequency at which the operator executes visual recognition compared with the above-described two kinds of display images, and it is envisaged that these display images are visually recognized under a limited condition like at the time of work start or in an interval in work. Therefore, it is preferable to classify these display images as images displayed at a position that does not fall within the visual field (effective visual field and induced visual field) of the operator (outside of the visual field range) in order to reduce troublesomeness of appearance in the visual field in normal work. Based on these points, in the present embodiment, in consideration of the frequency at which the operator visually recognizes each display image and so forth, each display image is set to be displayed in the visual field range (display region) according to characteristics of information shown by each display image. Next, by using FIG. 8, description will be made about classification of the visual field ranges and the kinds of display images displayed in each visual field range in the present embodiment.

FIG. 8 is a list showing the relation between the visual field ranges set by the visual field range setting section 33 according to the present embodiment, the size (horizontal angle, vertical angle) of each visual field range, plural display regions set on the display screen of the transparent display 11 corresponding to the respective visual field ranges, and the kinds of display images displayed in each display region (display image name). In the present embodiment, three ranges of the first visual field range, the second visual field range, and the outside of the visual field range are set as the visual field ranges. The first visual field range, the second visual field range, and the outside of the visual field range have a nested structure. The outside of the visual field range encompasses the second visual field range, and the second visual field range encompasses the first visual field range. However, the respective ranges are set in such a manner that an overlapping region does not exist, and a range encompassed in a certain range is excluded from this certain range. For example, the region in which a display image is displayed in the second visual field range is the region obtained by excluding the first visual field range in the region inside the second visual field range. The plural display regions set on the display screen of the transparent display 11 correspond to the first visual field range, the second visual field range, and the outside of the visual field range. The display region corresponding to the first visual field range is referred to as the first display region. The display region corresponding to the second visual field range is referred to as the second display region. The display region corresponding to the outside of the visual field range is referred to as the outside-of-visual-field-range display region.

The first visual field range is the smallest visual field range centered at the line-of-sight direction of the operator and the size thereof is decided in consideration of the effective visual field. Specifically, the line-of-sight direction of the operator is defined as the basis (0 degrees) and the inside of an ellipse that passes through the position of −10 degrees and the position of +10 degrees on the horizontal plane and passes through the position of −5 degrees and the position of +5 degrees on the vertical plane is defined as the first visual field range. In the first display region corresponding to the first visual field range, the distance-angle image 51 that indicates the distance between a target terrain surface and the tip part of the bucket 1c and the angle between the target terrain surface and the tip part of the bucket 1c is displayed.

The second visual field range is a visual field range that encompasses the first visual field range and is a visual field range centered at the line-of-sight direction of the operator similarly to the first visual field range. However, the first visual field range is excluded from the second visual field range. The size (outside contour line) of the second visual field range is decided in consideration of the induced visual field. Specifically, the line-of-sight direction of the operator is defined as the basis (0 degrees), and the region obtained by excluding the first visual field range from the inside of an ellipse that passes through the position of −40 degrees and the position of +40 degrees on the horizontal plane and passes through the position of −30 degrees and the position of +30 degrees on the vertical plane is defined as the second visual field range. In the second display region corresponding to the second visual field range, display images relating to warning indication are displayed. For example, the engine abnormality warning image 52, an icon of warning of a machine body abnormality, an image of warning of approach of a surrounding worker, and so forth are displayed.

The outside of the visual field range is a visual field range set outside the second visual field range and is a visual field range that belongs to neither the first visual field range nor the second visual field range. For example, when the first visual field range and the second visual field range have been decided on the basis of the line-of-sight direction of the operator on the screen of the transparent display 11, the region on the screen that belongs to neither the first visual field range nor the second visual field range becomes the outside of the visual field range. In the outside-of-visual-field-range display region corresponding to the outside of the visual field range, display images relating to the machine body state and the clock time are displayed. For example, an machine body state icon that includes the fuel level image 53 and shows various states relating to the machine body, a clock time image that shows the present clock time, an hour meter image that shows the cumulative value of the operating time of the hydraulic excavator, a water temperature (water temperature meter) image that shows the temperature of engine cooling water, an oil temperature (oil temperature meter) image that shows the temperature of hydraulic operating fluid, and so forth are displayed.

In the present embodiment, the method for setting two visual field ranges has been shown. However, it is also possible to set three or more visual field ranges on the basis of characteristics of information. Also in this case, the respective visual field ranges are set to have a nested structure, and a visual field range whose area defined by the outer edge (outside contour) of each visual field range is smaller in the plural visual field ranges is set as a display region in which a display image regarding which the number of times (frequency) of reference thereto made by the operator in work is larger is displayed. That is, a display image with a higher frequency of reference is set to be displayed in a display region (visual field range) closer to the line-of-sight direction of the operator. Further, there is a case in which it is difficult to perceive a display image even with displaying to the inside of the induced visual field when the operator is concentrating on work. Thus, the setting of the size of the visual field range is also not limited to that shown in the present embodiment and it is desirable to set a proper size also in consideration of the degree of importance of information shown by the display image, and so forth.

(Operation Range Storing Section 34)

The operation range storing section 34 stores the range in which the front work device 1A can operate (operation range). The hydraulic excavator 1 has a configuration in which the boom 1a, the arm 1b, and the bucket 1c each pivot and thereby the front work device 1A operates. Further, the boom 1a, the arm 1b, and the bucket 1c are each mechanically constrained and the range of the pivot is specified in advance. Therefore, the operation range of the front work device 1A can be computed. The operation range storing section 34 stores angles that represent the pivot ranges of the boom 1a, the arm 1b, and the bucket 1c and outputs the values to the outside-of-visual-field-range display region calculating section 35.

(Outside-of-Visual-Field-Range Display Region Calculating Section 35)

The outside-of-visual-field-range display region calculating section 35 calculates the range in which the line-of-sight direction 71 of the operator who sits on the operation seat can change based on the operation range of the front work device 1A stored in the operation range storing section 34. Further, based on the range in which the line-of-sight direction of the operator can change and the visual field range with the largest area (second visual field range) in the plural visual field ranges (first visual field range and second visual field range), the outside-of-visual-field-range display region calculating section 35 calculates the range in which this visual field range (second visual field range) can move on the screen of the transparent display 11. Moreover, the outside-of-visual-field-range display region calculating section 35 calculates the region obtained by excluding the range in which this visual field range (second visual field range) can move on the screen of the transparent display 11 from on the screen as the outside-of-visual-field-range display region.

The outside-of-visual-field-range display region calculating section 35 of the present embodiment calculates a display position that is outside of the visual field range of the operator (outside-of-visual-field-range display region) on the basis of the operation range of the front work device 1A and outputs the calculated display position to the display position calculating section 39. Next, specific processing by the outside-of-visual-field-range display region calculating section 35 will be described by using FIG. 9.

Figure 9:
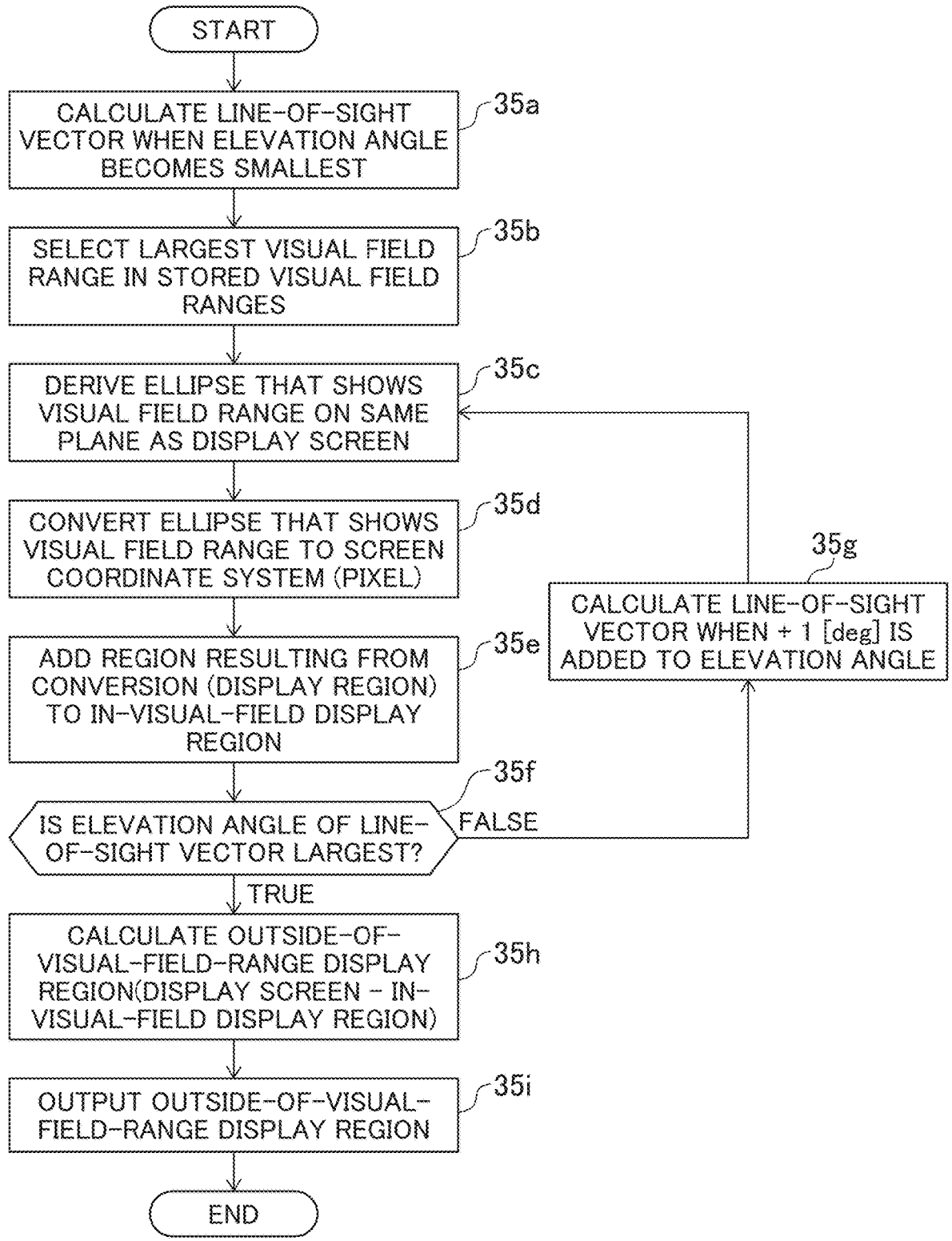
FIG. 9 is a diagram illustrating processing of an outside-of-visual-field-range display region calculating section.

FIG. 9 illustrates the specific processing by the outside-of-visual-field-range display region calculating section 35. First, in a step 35a, based on information regarding the operation range of the front work device 1A output from the operation range storing section 34, the outside-of-visual-field-range display region calculating section 35 calculates the line-of-sight vector 71 of the operator when the elevation angle becomes the smallest in the operation range (in other words, when the tip part (claw tip) of the bucket 1c is located on the lowermost side). The elevation angle is defined as a negative elevation angle when the line-of-sight vector 71 is oriented toward the lower side relative to the horizontal plane (that is, when a depression angle is made) and the sign of the elevation angle is set to the negative sign. At this time, the calculation of the line-of-sight vector 71 is executed based on the processing of the steps 32b to 32d by the line-of-sight estimating section 32 illustrated in FIG. 6, and the elevation angle of the line-of-sight vector 71 is calculated with the tip part of the bucket 1c set to the position with which the elevation angle becomes the smallest in the operation range of the front work device 1A.

Next, in a step 35b, the outside-of-visual-field-range display region calculating section 35 selects the largest visual field range (in the present embodiment, second visual field range) in the visual field ranges set by the visual field range setting section 33 on the basis of information from the visual field range setting section 33, and proceeds to a step 35c. The visual field range selected in the step 35b can be paraphrased as the visual field range located on the outermost side in the visual field ranges set by the visual field range setting section 33.

In the step 35c, the outside-of-visual-field-range display region calculating section 35 calculates the intersection of the plane including the display screen of the transparent display 11 and the line-of-sight vector 71 as the point of gaze. Further, based on the size of the visual field range selected in the step S35b, the outside-of-visual-field-range display region calculating section 35 obtains an ellipse that represents this visual field range centered at the point of gaze on the plane including the display screen. That is, this ellipse corresponds to the contour line of the second display range with the present line-of-sight vector 71. This ellipse is defined in the machine body coordinate system.

In a step 35d, the outside-of-visual-field-range display region calculating section 35 converts the ellipse of the machine body coordinate system obtained in the step S35c to a screen coordinate system by using the position and the pixel size of the transparent display 11. The screen coordinate system is a coordinate system used for executing rendering on the transparent display 11, and coordinate values that show the position of the pixel are used in a general display. The region in the ellipse obtained at this time (second display region) can become the visual field range of the operator. Therefore, the outside-of-visual-field-range display region calculating section 35 stores this region as an in-visual-field display region in a step 35e.

In a step 35f, the outside-of-visual-field-range display region calculating section 35 determines whether or not the elevation angle of the line-of-sight vector 71 used for the processing of the steps 35c to 35e (elevation angle of the line-of-sight vector 71 in the first round is the minimum value calculated in the step S35a) is the maximum value in the operation range of the front work device 1A. The maximum value of the elevation angle of the line-of-sight vector 71 in the operation range of the front work device 1A may be calculated when the step S35f is reached at the first time before the start of the flow or may be calculated in an any step before the step 35f is reached or before the start of the flow of FIG. 9.

When it is determined that the elevation angle of the line-of-sight vector 71 is not the maximum value in the step 35f, the line-of-sight vector 71 when 1 [deg] is added to the elevation angle is calculated in a step 35g, and the steps 35c to 35e are executed again. At this time, in the step 35e, while the in-visual-field display region stored thus far is held, a newly-calculated in-visual-field display region is stored in such a manner as to be added thereto. The unit angle added in the step 35g is not limited to 1 [deg] and another value can be set as appropriate in consideration of the load due to the processing, and so forth.

On the other hand, when it is determined that the elevation angle of the line-of-sight vector 71 is the maximum value in the step 35f, the outside-of-visual-field-range display region is calculated in a step 35h. The outside-of-visual-field-range display region is obtained by subtracting the in-visual-field display region from the whole of the display screen of the transparent display 11.

In a step 35i, the outside-of-visual-field-range display region calculating section 35 outputs the outside-of-visual-field-range display region obtained by the processing to the step 35h to the display position calculating section 39, and ends the series of processing.

In the present embodiment, the hydraulic excavator 1 is assumed and description has been made about the processing in which the movement direction of the tip part of the bucket 1c is limited to the vertical direction. However, in a work machine having the front work device 1A having a range of motion in the horizontal direction, repetitive processing in which operation in the horizontal direction is considered is executed. Further, the outside-of-visual-field-range display region is invariable as long as the setting value of the visual field range set in the visual field range setting section 33 is not changed. Therefore, a configuration may be employed in which the result of the above-described processing is stored in the storing device in the transparent display C/U or an external storing device and reference to the stored result is made when needed and calculation is not executed every processing cycle of the transparent display C/U 30.

(Monitor Position Storing Section 36)

The monitor position storing section 36 stores the position of a point (often referred to as a "representative point") at which a detail of a display image displayed on the transparent display 11 or information that relates thereto (related information) is displayed on the monitor 12 (representative point position) as coordinates in the machine body coordinate system. In the present embodiment, the monitor 12 is used as a second display device (different display device) that displays related information of a display image as work support information together with the transparent display 11 (first display device) on which the display image is displayed. The representative point on the monitor 12 is not limited to one point. When plural pieces of related information are displayed on the monitor 12, plural representative points may be set corresponding to the respective pieces of related information. Further, the representative point on the monitor 12 may be changed as appropriate according to output from the monitor C/U 50, for example, without being set to a fixed value.

(First Present Display Position Storing Section 37 and Second Present Display Position Storing Section 38)

The first present display position storing section 37 and the second present display position storing section 38 are sections that store the display positions of all display images in the first display region (first visual field range) and the second display region (second visual field range) calculated by the display position calculating section 39 to be described later, and the storage area thereof is ensured in the storing device of the transparent display C/U 30. The display positions of the display images are stored as coordinate values in the screen coordinate system set on the display screen of the transparent display 11. When the display positions of the respective display images calculated in the display position calculating section 39 change, the coordinate values of the respective display images stored in the storing sections 37 and 38 are always held as the latest ones by updating coordinate values before the change to coordinate values after the change.

(Display Position Calculating Section 39)

The display position calculating section 39 sets plural display regions corresponding to plural visual field ranges set by the visual field range setting section 33 on the screen of the transparent display 11 on the basis of the line-of-sight vector (line-of-sight direction) 71 of the operator estimated by the line-of-sight estimating section 32, and calculates the display position of the display image in such a manner that the display position is located in the display region corresponding to the kind of display image in the plural display regions set on the screen of the transparent display 11. The display position of the display image calculated by the display position calculating section 39 is output to the display control section 40. Next, processing executed by the display position calculating section 39 according to the present embodiment will be described by using FIG. 10.

Figure 10:
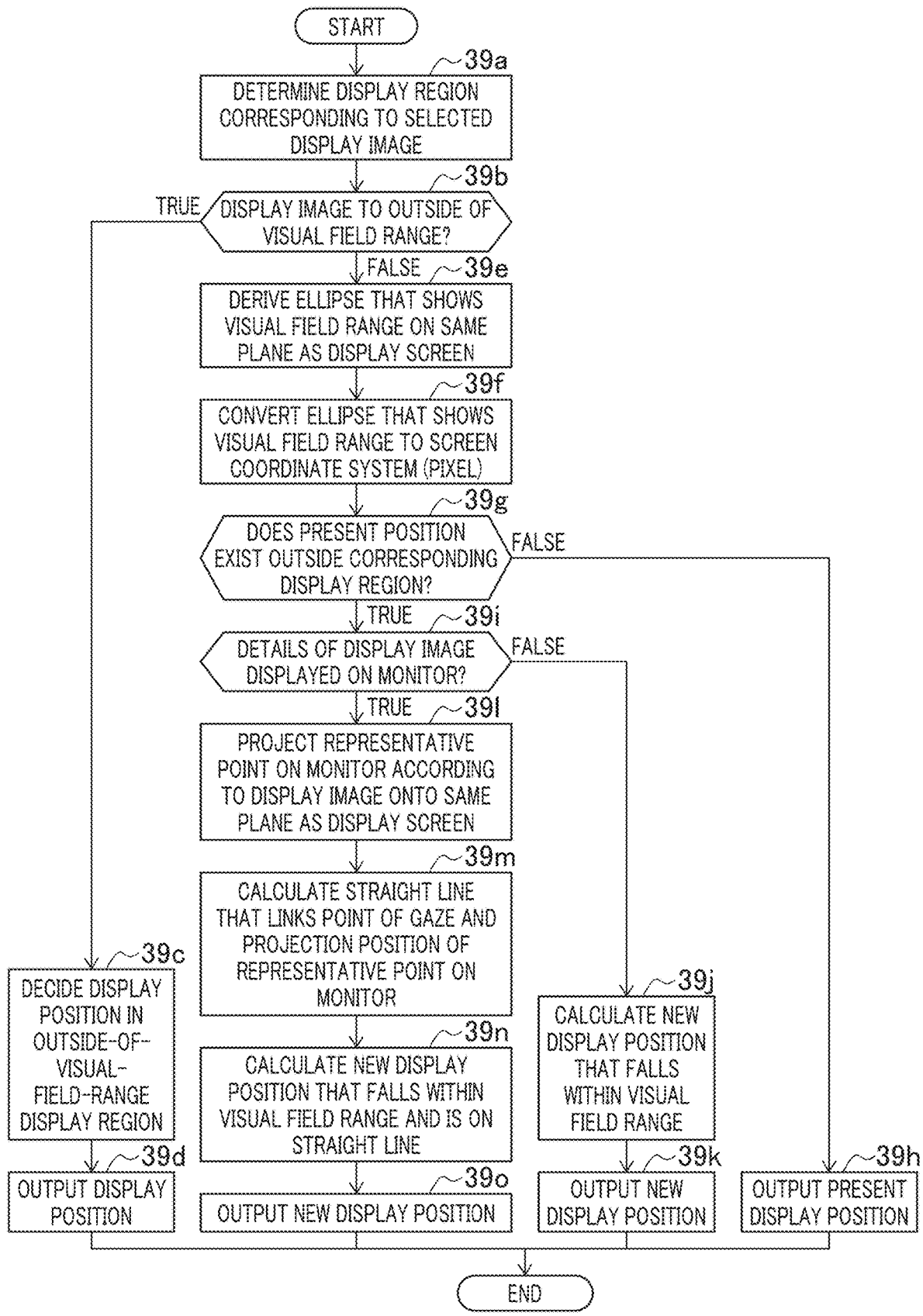
FIG. 10 is a diagram illustrating processing of a display position calculating section.

FIG. 10 is a flowchart illustrating the processing by the display position calculating section 39 according to the present embodiment. First, in a step 39*a*, the display position calculating section 39 selects one display image from one or more display images to be displayed on the transparent display 11, and determines which display region in the first display region (first visual field range), the second display region (second visual field range), and the outside-of-visual-field-range display region (outside of the visual field range) the kind of display image selected (hereinafter, often referred to as a "selected display image") corresponds to as the image to be displayed therein. In a case of displaying plural display images on the transparent display 11, the display positions of all display images are decided by the flowchart of FIG. 10.

In a step 39*b*, the display position calculating section 39 determines whether or not the selected display image of the step 39*a* is a display image to be displayed in the outside-of-visual-field-range region. When here it is determined that the selected display image is a display image to the outside-of-visual-field-range display region, the display position calculating section 39 proceeds to a step 39*c* and decides the display position (coordinate values in the screen coordinate system) of the display image in the outside-of-visual-field-range display region (step 39*c*). The display position in the outside-of-visual-field-range display region at this time may be always the same coordinate values or may be coordinate values calculated each time according to the position of the point of gaze or the like. In a step 39*d*, the coordinate values decided in the step 39*c* are output to the display control section 40 as the display position of the selected display image.

On the other hand, when it is determined that the selected display image is not a display image to the outside-of-visual-field-range display region in the step 39*b* (that is, when it is determined that the selected display image is a display image to be displayed in either the first display region or the second display region), the display position calculating section 39 proceeds to a step 39*e*.

In the step 39*e* and a step 39*f*, the display position calculating section 39 calculates the display region on the display screen of the transparent display 11 with respect to the present line-of-sight vector 71 similarly to the step 35*c* and the step 35*d* (see FIG. 9) of the above-described outside-of-visual-field-range display region calculating section 35. That is, when the direction of the line-of-sight vector 71 of the operator changes, the position of the display region corresponding to the display region relating to the determination result of the step 39*a* on the display screen of the transparent display 11 is changed according to the change in the line-of-sight vector 71. In the example of FIG. 9, only the second display region (second visual field range) is the calculation subject. Here, either one display region of the first display region (first visual field range) and the second display region (second visual field range) becomes the calculation subject according to the determination result in the step 39*a*.

Thereafter, in a step 39*g*, the display position calculating section 39 determines whether or not the present display position (display position at the time of previous calculation of the display position) of the selected display image exists outside the display region that has been calculated in the step 39*f* and corresponds to the kind of selected display image. When here it is determined that the present display position is in the corresponding display region, the display position calculating section 39 outputs the present display position as it is in a step 39*h*. That is, when the selected display image is located in the display region corresponding to the kind of this selected display image also after change in the visual field range due to direction movement of the line-of-sight vector 71, the display position calculating section 39 holds the display position of this selected display image.

On the other hand, when it is determined that the present display position is outside the corresponding display region in the determination of the step 39*g*, the display position calculating section 39 proceeds to a step 39*i* and determines whether or not details of the selected display image or information that relates thereto (referred to as "related information of the selected display image") is displayed on the monitor 12.

When the related information of the selected display image is not displayed on the monitor 12 in the step 39*i*, the display position calculating section 39 decides a new display position in such a manner that the new display position falls within the display region corresponding to the selected display image in a step 39*j* and outputs the new display position to the display control section 40 (step 39*k*). That is, after change in the position of the display region due to direction movement of the line-of-sight vector 71, when the selected display image gets out of the display region corresponding to the kind of this selected display image, the display position calculating section 39 calculates the new display position of this selected display image in such a manner that the new display position falls within the display region corresponding to the kind of this selected display image. As the calculation method of the new display position, for example, there is a method in which such an initial display position as to be displayed in the corresponding display region is set in advance as a relative position based on the position of the point of gaze and the new display position is calculated by calculating the initial display position from the present position of the point of gaze. Further, with the size of the bucket 1*c* stored in the storing device in the transparent display C/U 30 in advance, an algorithm to calculate the new display position from the present position and the size of the bucket 1*c* in such a manner that the selected display image does not overlap with the actual image of the bucket 1*c* in the corresponding display region may be used.

On the other hand, when the related information of the selected display image is displayed on the monitor 12 in the step 39*i*, the display position calculating section 39 proceeds to a step 39*l*. In the step 39*l*, the display position calculating section 39 calls, from the monitor position storing section 36, the representative point position (coordinate values in the coordinate system set in the monitor 12) at which the related information of the selected display image is displayed on the monitor 12, and projects the representative point position onto the plane including the display screen of the transparent display 11 (orthographic projection). Moreover, in a step 39*m*, the display position calculating section 39 obtains a straight line that links the representative point projected in the step 39*l* and the point of gaze (intersection of the line-of-sight vector 71 and the plane onto which the representative point is projected) in the screen coordinate system. Then, the display position calculating section 39 decides a new display position of the selected display image in such a manner that the new display position falls within the display region corresponding to the kind of this selected display image and is on the straight line obtained in the step 39m (step 39n), and outputs the new display position to the display control section 40 (step 39o). As above, when details of the display image or information that relates thereto is displayed on the monitor 12, it becomes possible to shorten the time for movement of the line of sight from the display image to the monitor 12 by disposing the display image on the straight line that links the point of gaze and the representative point position on the monitor 12.

When the step 39d, 39o, 39k, or 39h has been completed as described above, the display position calculating section 39 ends the series of processing illustrated in FIG. 10 and waits until the next control cycle regarding the display position calculation of the relevant selected display image. However, the display position of the selected display image output to the display control section 40 in the step 39o, 39k, or 39h is stored in the corresponding storing section in the first present display position storing section 37 and the second present display position storing section 38. The storing timing of this display position may be any timing as long as it is after the calculation of the display position and before the output to the display control section 40. When plural display images are displayed on the transparent display 11, calculation of the display positions of all display images may be processed in parallel.

(Display Control Section 40)

The display control section 40 generates a signal to output the display image generated in the display image generating section 31 to the transparent display 11 on the basis of the display position of the display image calculated in the display position calculating section 39. Thereby, the display image is displayed at the decided display position on the transparent display 11.

Figure 11:
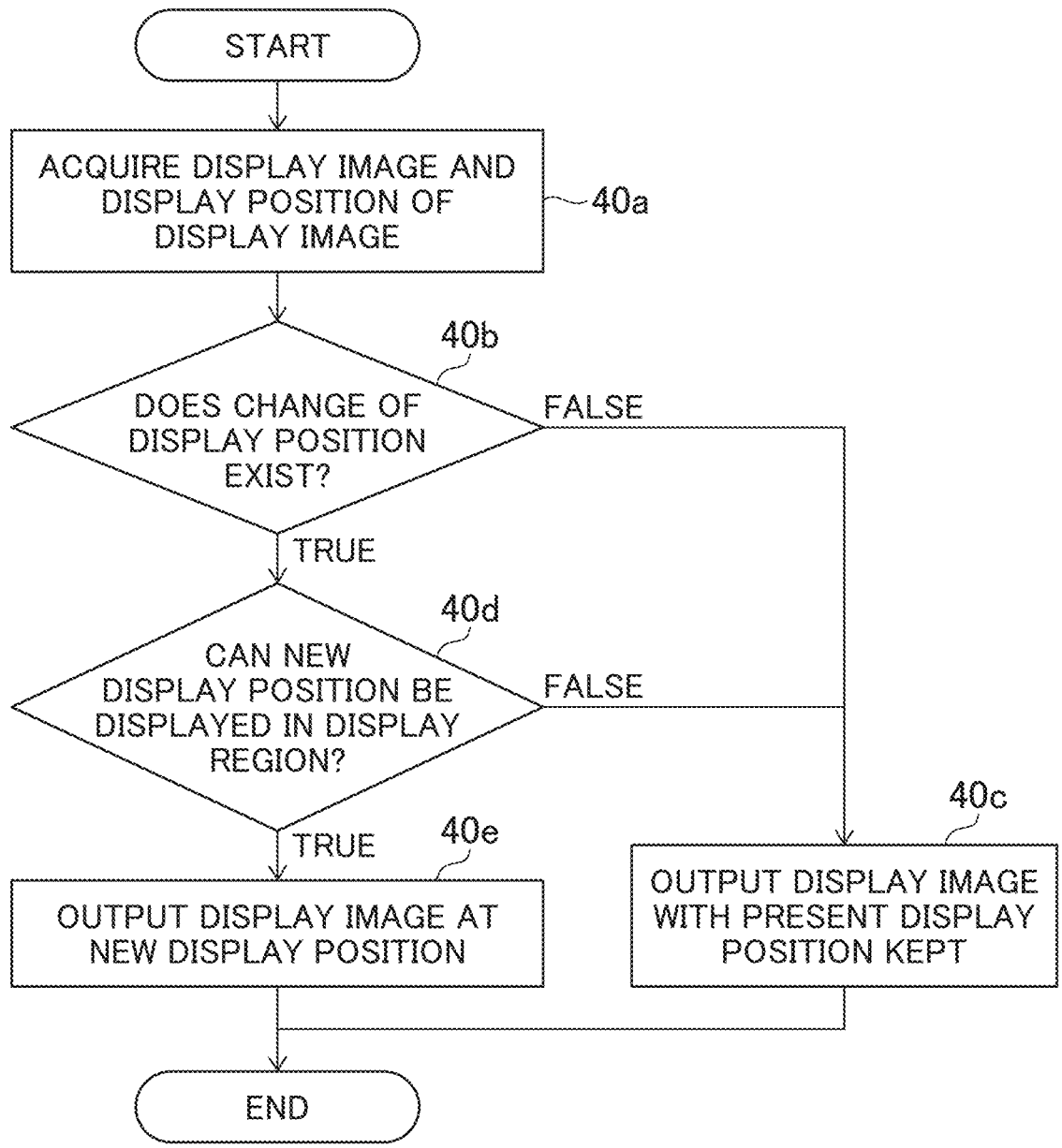
FIG. 11 is a diagram illustrating processing of a display control section.

FIG. 11 is a flowchart of processing executed by the display control section 40 according to the present embodiment. First, in a step 40a, the display control section 40 acquires a display image generated in the display image generating section 31 and coordinate values calculated in the display position calculating section 39 as the display position of the display image.

In a step 40b, the display control section 40 determines whether or not the display position acquired in the step 40a has been changed from the position of the previous time. At this time, when it is determined that the change of the display position does not exist, in a step 40c, the display control section 40 outputs the display image with the present display position (display position of the previous time) kept. On the other hand, when it is determined that the change of the display position exists, the display control section 40 proceeds to a step 40d.

In the step 40d, the display control section 40 determines whether or not a new display position of the display image is a position that can be displayed on the transparent display 11 on the basis of the resolution of the transparent display 11. Here, the display control section 40 outputs the display image at the new display position when it is determined that the new display position can be displayed, and outputs the display image with the present display position (display position of the previous time) kept (step 40e) when the new display position can not be displayed, and ends the series of processing.

In the present embodiment, description has been made about a case in which the determination processing of whether or not change of the display position exists (step 40b) and the determination processing of whether or not the new display position can be displayed (step 40d) are executed in the display control section 40. However, these kinds of processing may be executed in the display position calculating section 39. In this case, the display control section 40 executes only processing of displaying a display image of a subject at a display position calculated in the display position calculating section 39.

(Operation and Effects)

Operation and effects of the hydraulic excavator according to the present embodiment configured as described above will be described with reference to drawings. Here, as one example, description will be made about operation when the image 51 of the distance and the angle between a target terrain surface and the tip part of the bucket 1c (hereinafter, often abbreviated as the "distance-angle image 51"), the engine abnormality warning image 52, and the fuel level image 53 illustrated in FIG. 5 are employed as display images. As already described, the distance-angle image 51 is a display image displayed in the first display region, the engine abnormality warning image 52 is a display image displayed in the second display region, and the fuel level image 53 is a display image displayed in the outside-of-visual-field-range display region.

1. Initial Posture

Figure 12:
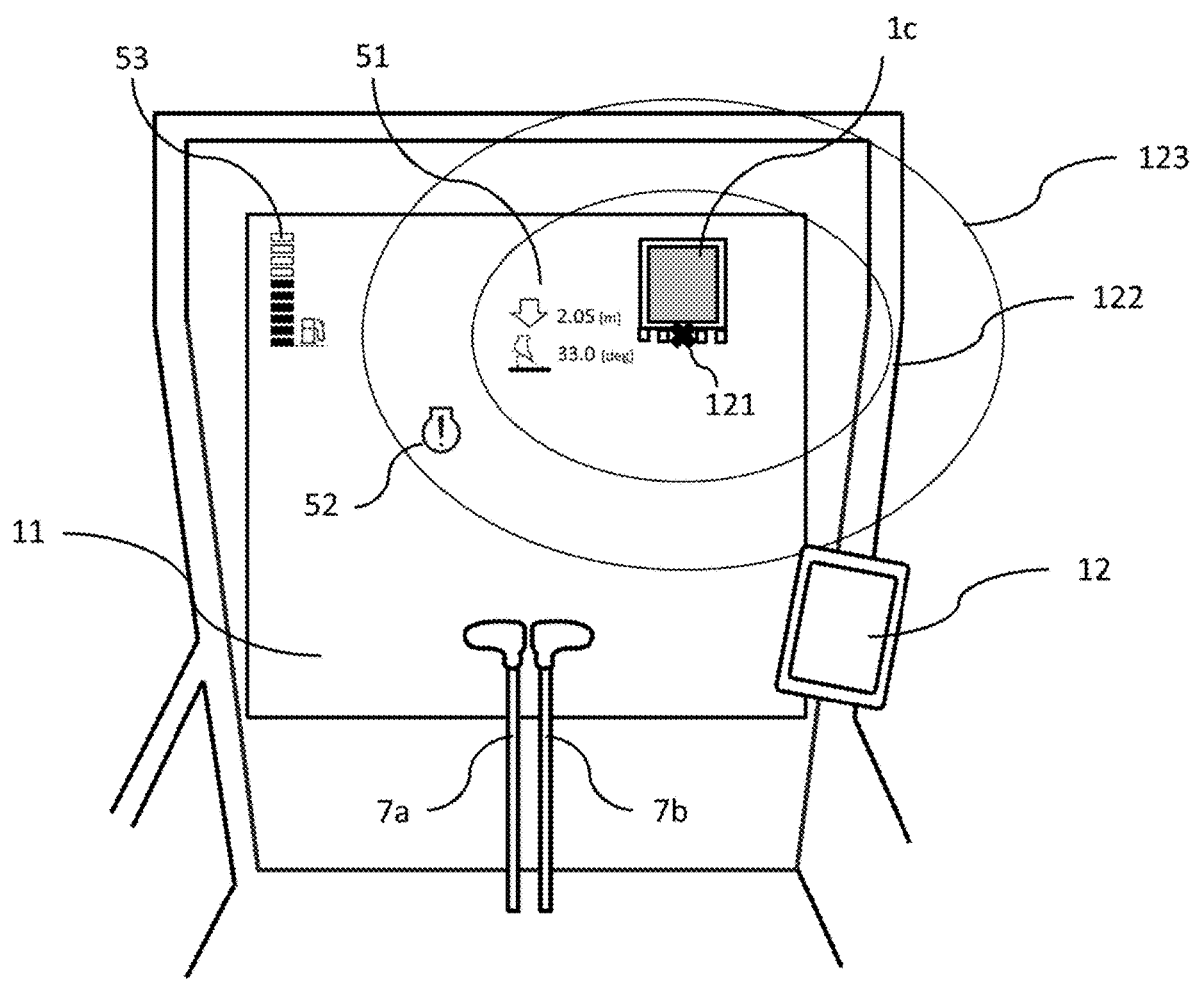
FIG. 12 is a diagram illustrating the display state of a transparent display in initial posture.

FIG. 12 illustrates the display state of the transparent display 11 when the pivot angles of the boom 1a, the arm 1b, and the bucket 1c are stationary in a certain state (hereinafter, referred to as "initial posture"). The distance-angle image 51 and the engine abnormality warning image 52 are displayed in such a manner that, in the display position calculating section 39, the display positions are so decided as to each fall within the visual field range (first display region 122 and second display region 123 defined by ellipses centered at a point of gaze 121) corresponding to each display image set in the visual field range setting section 33. On the other hand, for the fuel level image 53, the display position is set at a position that falls within the outside-of-visual-field-range display region calculated by the outside-of-visual-field-range display region calculating section 35 (outside-of-visual-field-range display region is the region obtained by excluding the first display region 122 and the second display region 123 from the display screen of the transparent display 11). At this time, regarding the distance-angle image 51 and the engine abnormality warning image 52, details thereof or information that relates thereto is not displayed on the monitor 12. Therefore, the display positions can be decided as desired in the respective display regions 122 and 123 (that is, constraint on the display position due to the display position of the related information on the monitor 12 is not received).

2. When Bucket is Lowered by 0.25 [m] from Initial Posture

Figure 13:
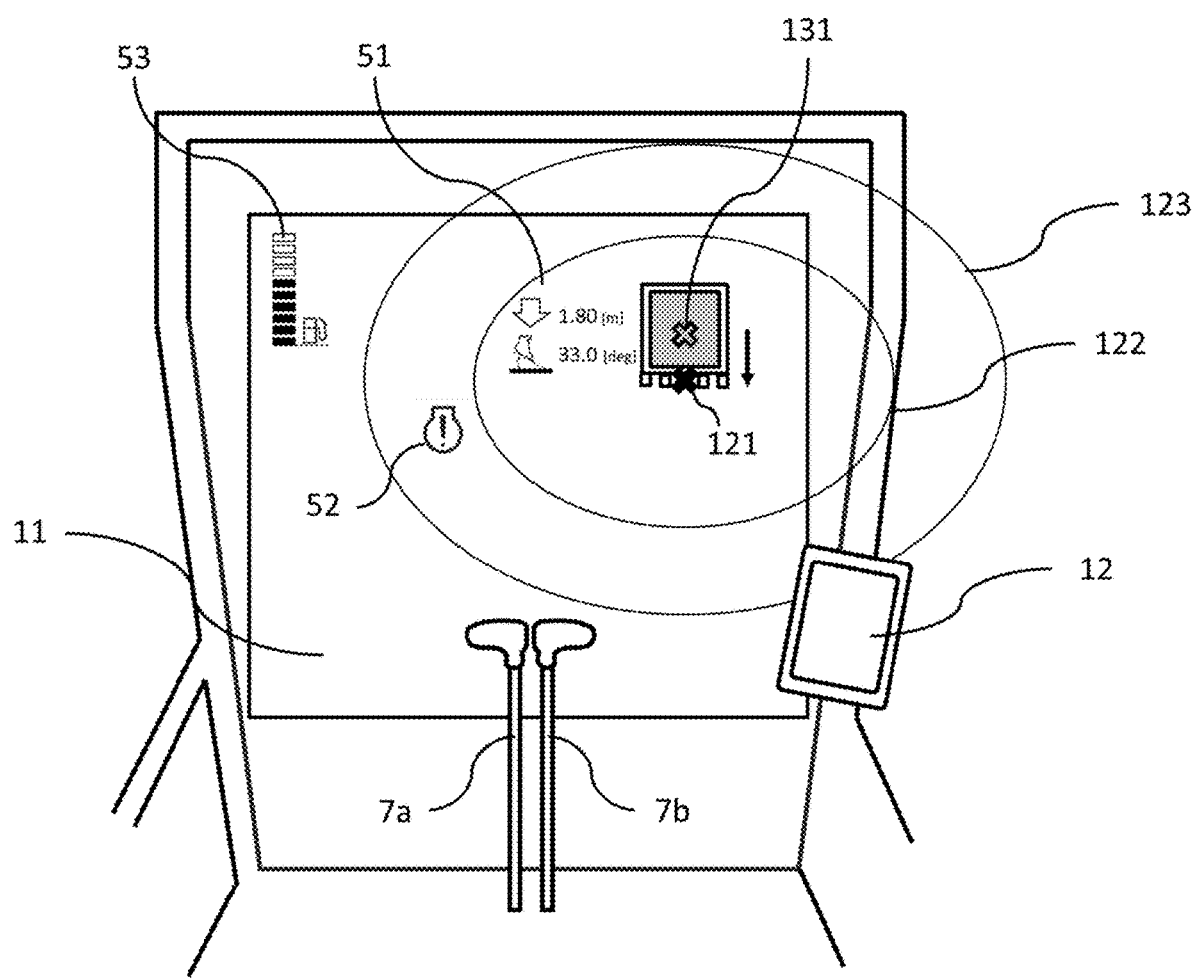
FIG. 13 is a diagram illustrating the display state of the transparent display when fine operation has been executed.

FIG. 13 illustrates the display state of the transparent display 11 when the position of the bucket 1c has been lowered by 0.25 [m] in the vertical direction from the initial posture state of FIG. 12. In this case, when the position of a point 131 of gaze with the initial posture is defined as the basis, the movement displacement of the tip part of the bucket 1c (point of gaze) from the position 131 is small. Therefore, the display positions of the distance-angle image 51 and the engine abnormality warning image 52 are both still displayed in the respective display regions (first display region 122 and second display region 123), and the display positions are not changed. As above, in the present embodiment, the display position of the display image is not changed regarding fine displacement of the position of the bucket 1c. Therefore, the operator can be prevented from feeling troublesomeness due to frequent change of the display position of the display image.

3. When Bucket is Lowered by 1.45 [m] from Initial Posture

Figure 14:
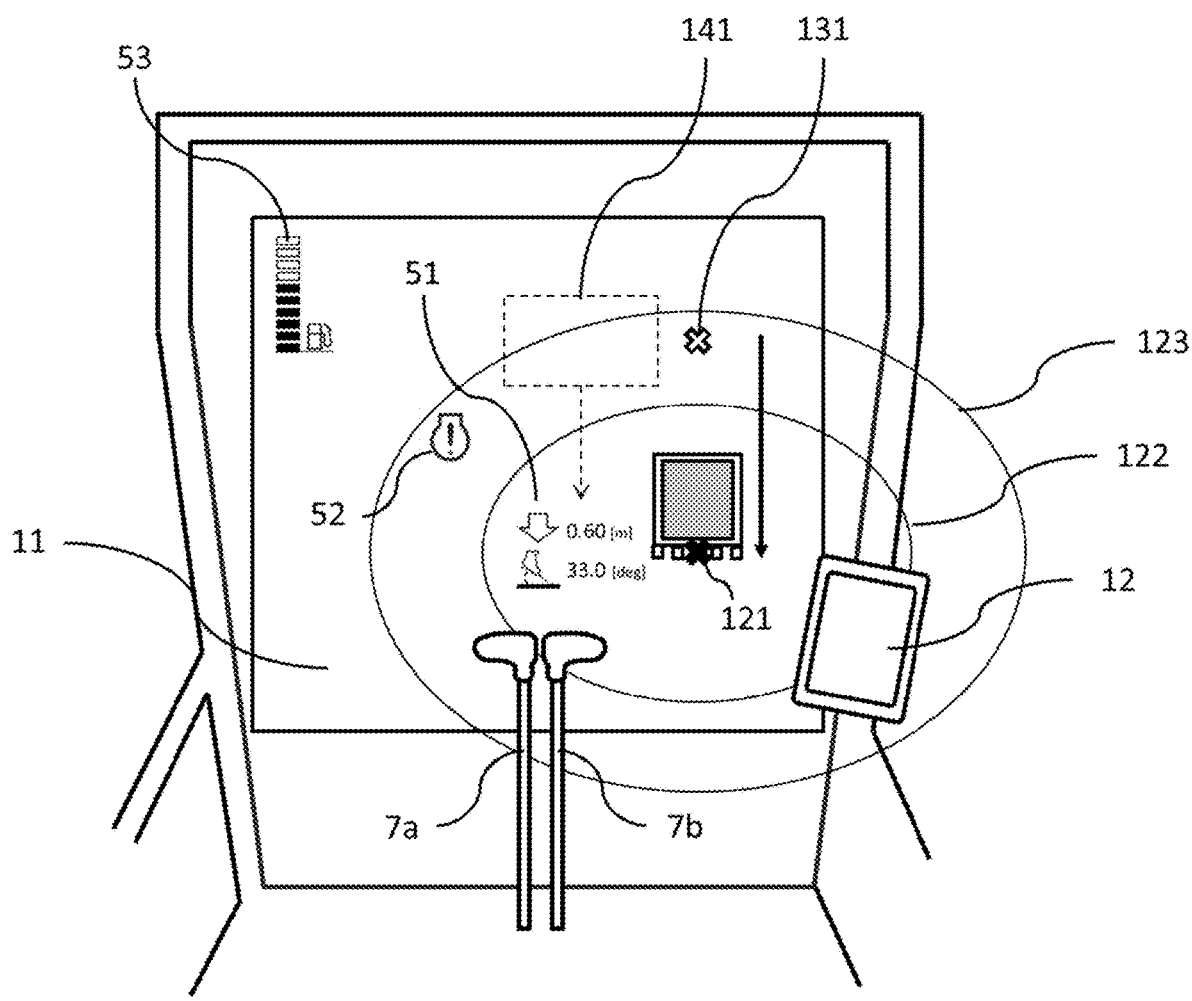
FIG. 14 is a diagram illustrating the display state of the transparent display when operation by an amount equal to or larger than a certain amount has been executed.

FIG. 14 illustrates the display state of the transparent display 11 when the position of the bucket 1c has been lowered by 1.45 [m] in the vertical direction from the initial posture state of FIG. 12. In this case, displacement from the position of the point 131 of gaze with the initial posture is large and a display position 141 of the distance-angle image 51 with the initial posture gets out of the first display region 122, which is the corresponding display region. Thus, the display position calculating section 39 calculates a new display position of the distance-angle image 51 in such a manner that the new display position is disposed in the first display region 122 based on the position of the latest point of gaze 121 (bucket 1c). On the other hand, the engine abnormality warning image 52 falls within the second display region 123 also after the movement of the point of gaze 121, and thus the display position is not changed. In this way, only when the display image gets out of the display region set according to the kind thereof, the display position thereof is changed. Due to this, work can be executed while the proper display position according to the kind of display image is kept.

4. When Related Information is Displayed on Monitor 12 with Initial Posture

Figure 15:
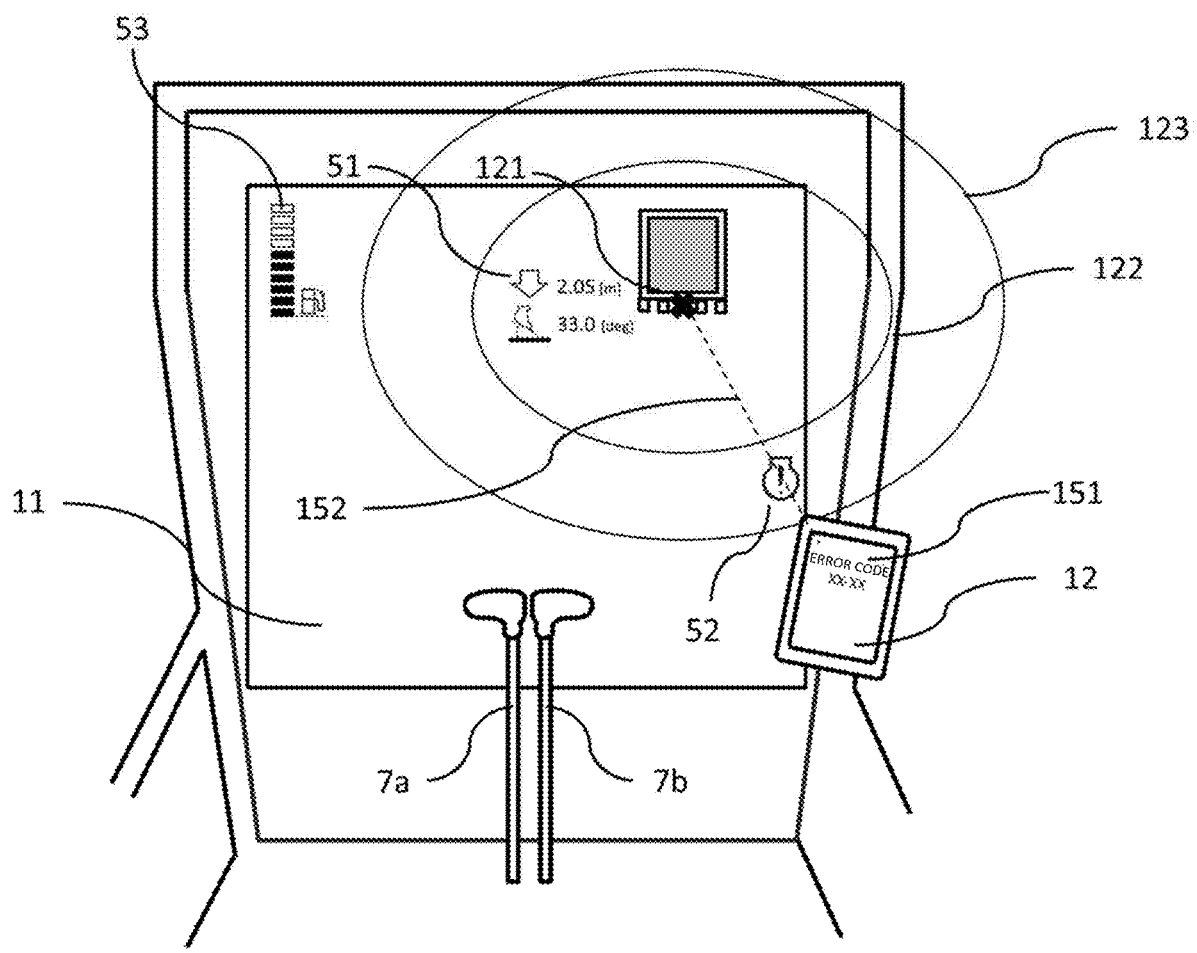
FIG. 15 is a diagram illustrating the display state of the transparent display when related information is displayed on a monitor.

FIG. 15 illustrates the display state when information showing details of engine abnormality warning that are the related information of the engine abnormality warning image 52 is displayed on the monitor 12 in the initial posture state of FIG. 12. It is envisaged that, at this time, the operator acknowledges that the hydraulic excavator 1 is in an engine abnormality state on the transparent display 11 and checks more detailed information on the monitor 12. Thus, according to the processing of the steps 39l to 39o by the display position calculating section 39, the engine abnormality warning image 52 is displayed on a straight line 152 that links the point of gaze 121 and the representative point on the monitor 12 and in the second display region 123. Due to this, it is possible to shorten the time for movement of the line of sight when the related information on the monitor 12 is checked after the engine abnormality warning image 52 is recognized by the transparent display 11.

5. When New Display Position is Outside Display Screen of Transparent Display 11

Figure 16:
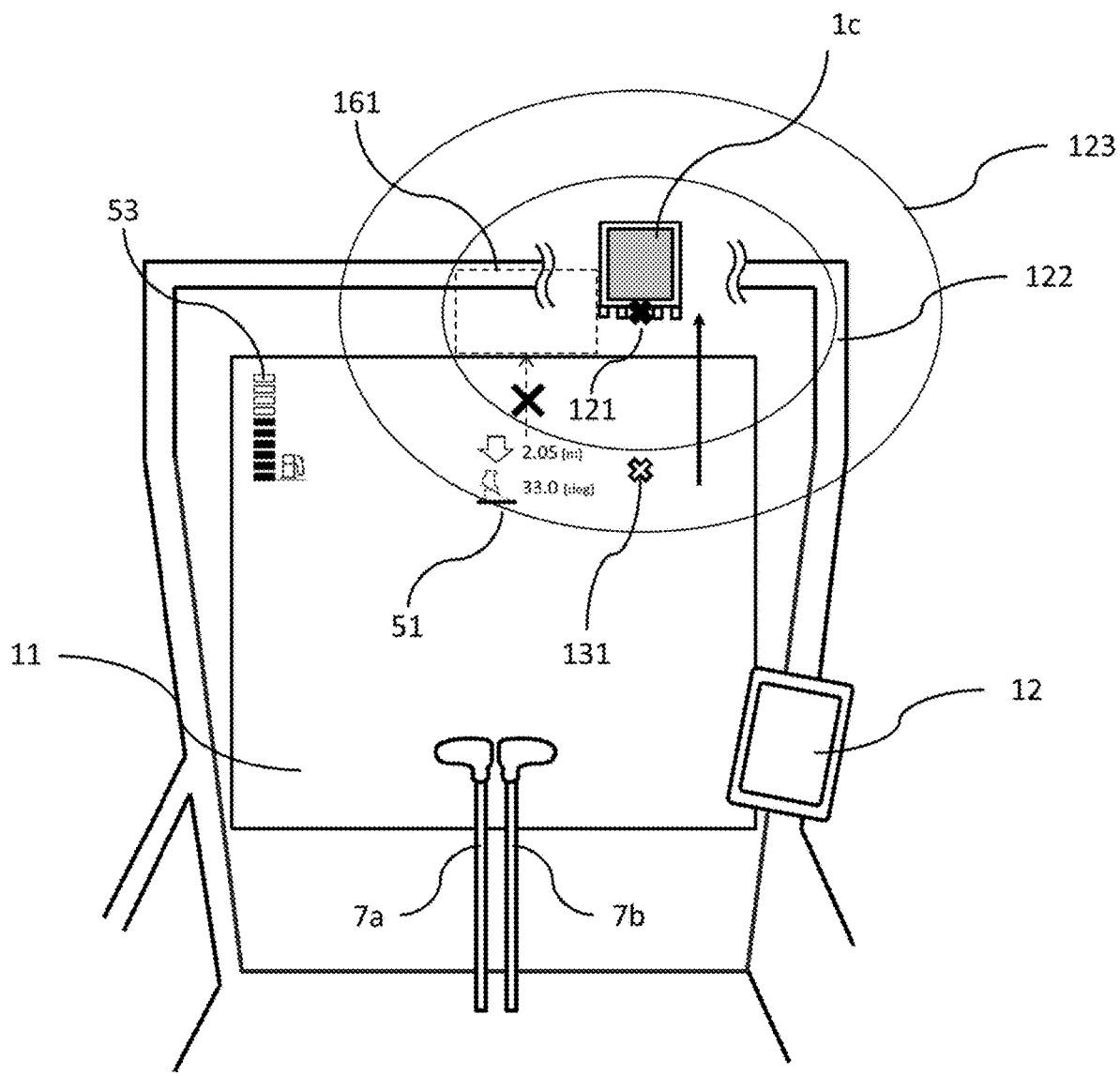
FIG. 16 is a diagram illustrating the display state of the transparent display when the position of a bucket has been moved by a distance equal to or longer than a certain distance in the vertically upward direction.

FIG. 16 illustrates the display state when the position of the bucket 1c has been moved by a distance equal to or longer than a certain distance in the vertically upward direction from the initial posture state of FIG. 12. At this time, the distance-angle image 51 gets out of the first display region 122. Therefore, according to the above-described processing, the display position calculating section 39 calculates an initial display position in the first display region 122 as a new display position 161 of the distance-angle image 51. However, the new display position 161 is located outside the display screen of the transparent display 11. Therefore, according to the processing of the step 40c by the display control section 40, the distance-angle image 51 keeps the display position at the time of the initial posture. If the new display position 161 of the display image gets out of the display screen of the transparent display 11 due to the movement of the point of gaze 121 as above, for example, when calculating the new display position 161 in a range that falls within the display screen is tried each time (for example, the display position that is in the display screen of the transparent display 11 and has the shortest distance from the tip part of the bucket 1c is calculated as the new display position, or the like), the display position on the transparent display 11 is frequently switched in response to operation of the bucket 1c and troublesomeness is possibly caused. However, in the present embodiment, the most recent display position is continued in the period until the new display position 161 falls within the corresponding display region and within the display screen of the transparent display 11. Therefore, frequent occurrence of switching of the display position can be prevented even in work in which the position of the bucket 1c is located on the upper side of the transparent display 11, and the operator can be prevented from feeling troublesomeness due to frequent switching of the display position. Thus, the work efficiency can be improved.

6. Summarization

As described above, in the hydraulic excavator according to the present embodiment, a display region that changes along with movement of the tip part of the bucket 1c (line-of-sight direction of the operator) is set on the transparent display 11, and the display position of work support information (display image) is changed to the inside of the corresponding display region only when the display position gets out of the corresponding display region due to the movement of the tip part of the bucket 1c. This can shorten the time for movement of the line of sight necessary for visual recognition of the work support information and reduce troublesomeness caused due to frequent change of the display position. Further, setting plural visual field ranges (display regions) and selecting the visual field range (display region) suitable for characteristics of displayed work support information can be minimize the number of pieces of work support information displayed near the bucket, and thereby alleviating the lowering of visibility of the vicinity of the bucket in association with increase in pieces of displayed information. Moreover, a specific display image on the transparent display 11 is displayed on a straight line between the point of gaze 121 and the monitor 12. This can shorten the time for movement of the line of sight from the transparent display 11 to the monitor 12 and improve the work efficiency.

The present invention is not limited to the above-described embodiment and various modification examples in such a range as not to depart from the gist thereof are included. For example, the present invention is not limited to what includes all configurations explained in the above-described embodiment and what are obtained by deleting part of the configurations are also included. Further, part of configurations according to a certain embodiment can be added to or substituted for a configuration according to another embodiment.

Moreover, regarding the respective configurations relating to the above-described controllers (C/Us 10, 20, 30, 50), functions and execution processing of these respective configurations, and so forth, part or all of them may be implemented by hardware (for example, logic that executes the respective functions is designed with an integrated circuit, or the like). Further, as the configurations relating to the above-described controllers, a program (software) that is read out and executed by a processing device (for example, CPU) to cause implementation of the respective functions relating to the configurations of these controllers may be employed. Information relating to this program can be stored in semiconductor memory (flash memory, SSD, and so forth), magnetic storing device (hard disk drive and so forth), recording medium (magnetic disc, optical disc, and so forth), and so forth, for example.

In the explanation of the above-described respective embodiments, as control lines and information lines, what are understood as necessary ones for the explanation of these embodiments are shown. However, all control lines and information lines relating to products are not necessarily shown. It may be thought that actually almost all configurations are mutually connected.

DESCRIPTION OF REFERENCE CHARACTERS

1A: Front work device
1B: Machine body
1a: Boom
1b: Arm
1c: Bucket
1d: Upper swing structure
1e: Lower track structure
1f: Cab
8a, 8b, 8c: Angle sensor (posture sensor)
11: Transparent display (display device (first display device))
12: Monitor (different display device (second display device))
20: Main C/U
30: Transparent display C/U (display controller)
31: Display image generating section
32: Line-of-sight estimating section
33: Visual field range setting section
34: Operation range storing section
35: Outside-of-visual-field-range display region calculating section
36: Monitor position storing section
37: First present display position storing section
38: Second present display position storing section
39: Display position calculating section
40: Display control section
50: Monitor C/U
71: Line-of-sight vector
81: Visual field range list
121: Point of gaze
122: First display region
123: Second display region
121: Present position of the tip part of the bucket (point of gaze)
131: Position of the tip part of the bucket (point of gaze) at the time of initial posture
141: Position of displaying of the distance and the angle between a target terrain surface and the tip part of the bucket at the time of initial posture

The invention claimed is:

1. A work machine comprising:
a work device attached to a work machine main body;
a posture sensor that detects posture of the work device;
a display device capable of displaying work support information provided to an operator in such a manner as to overlap the work support information with an actual image of the work device; and
a display controller that decides a display position on the display device regarding a display image that shows the work support information and displays the display image at the display position, wherein
the display controller is configured to
estimate a line-of-sight direction of the operator on a basis of the posture of the work device detected by the posture sensor,
set a plurality of display regions on a screen of the display device with use of the estimated line-of-sight direction of the operator as a basis, and calculate the display position of the display image in such a manner that the display position is located in a display region corresponding to a kind of the display image in the plurality of display regions, and
when positions of the plurality of display regions on the screen of the display device change due to change of the line-of-sight direction of the operator, hold the display position of the display image if the display image is located in the display region corresponding to the kind of the display image also after the change and calculate a new display position of the display image in such a manner that the new display position falls within the display region corresponding to the kind of the display image if the display image gets out of the display region corresponding to the kind of the display image after the change.

2. The work machine according to claim 1, wherein
the plurality of display regions include a first display region corresponding to a first visual field range defined around the line-of-sight direction of the operator and a second display region corresponding to a second visual field range that encompasses the first visual field range are, and
a first kind of display image is displayed in the first display region and a second kind of display image is displayed in a region obtained by excluding the first display region in a region inside the second display region.

3. The work machine according to claim 1, wherein
the display controller is configured to calculate a range in which the plurality of display regions are allowed to move on the screen of the display device on a basis of a range in which the work device is allowed to operate and the plurality of display regions, and calculate, as an outside-of-visual-field-range display region, a region obtained by excluding the range in which the plurality of display regions are allowed to move on the screen of the display device from on the screen of the display device,
a third kind of display image is set to be displayed in the outside-of-visual-field-range display region, and
the display controller is configured to calculate a display position of the third kind of display image in such a manner that the display position is located in the outside-of-visual-field-range display region.

4. The work machine according to claim 1, wherein
the display position of the display image is decided in advance regarding each of the plurality of display regions, and
the display controller is configured to, if the positions of the plurality of display regions change on a display screen of the display device due to change of the line-of-sight direction of the operator, hold the display position of the display image if the display screen gets out of the display region corresponding to the kind of the display image and the pre-decided display position calculated as the new display position of the display image is outside the display regions of the display screen.

5. The work machine according to claim 1, further comprising:
a different display device that displays related information of the display image, wherein
the display controller is configured to calculate the display position of the display image in such a manner that the display position is located on a straight line that links a position at which the related information is displayed on the different display device and an intersection of the line-of-sight direction of the operator and a display screen of the display device.

\* \* \* \* \*